(12) United States Patent
Simpson et al.

(10) Patent No.: US 11,370,542 B2
(45) Date of Patent: Jun. 28, 2022

(54) HIGH TRANSPORT EFFICIENCY AIRCRAFT APPARATUS, SYSTEMS AND METHODS TO PRECISELY DELIVER CARGO AT A POINT IN SPACE WITHOUT STOPPING

(71) Applicant: Corvidair Inc., Walnut, CA (US)

(72) Inventors: Star Simpson, Glendale, CA (US); Barnaby Wainfan, Long Beach, CA (US)

(73) Assignee: Corvidair Inc., Walnut, CA (US)

( * ) Notice: Subject to any disclaimer, the term of this patent is extended or adjusted under 35 U.S.C. 154(b) by 137 days.

(21) Appl. No.: 16/983,851

(22) Filed: Aug. 3, 2020

(65) Prior Publication Data

US 2021/0107649 A1 Apr. 15, 2021

Related U.S. Application Data

(60) Provisional application No. 62/882,471, filed on Aug. 2, 2019.

(51) Int. Cl.
*B64D 1/12* (2006.01)
*B64C 39/02* (2006.01)

(52) U.S. Cl.
CPC ............ *B64D 1/12* (2013.01); *B64C 39/024* (2013.01); *B64C 2201/028* (2013.01); *B64C 2201/128* (2013.01)

(58) Field of Classification Search
CPC .... B64D 1/02; B64D 1/06; B64D 1/10; B64C 2201/028; B64C 2201/128
See application file for complete search history.

(56) References Cited

U.S. PATENT DOCUMENTS

| 4,161,301 A * | 7/1979 | Beardsley | B64D 1/10 89/1.51 |
| 6,739,554 B1 * | 5/2004 | Stanek | F15D 1/00 244/130 |
| 2010/0171001 A1 * | 7/2010 | Karem | G05D 1/0858 244/76 R |
| 2017/0038780 A1 * | 2/2017 | Fandetti | G06Q 10/083 |
| 2018/0244383 A1 * | 8/2018 | Valente | B64C 17/02 |
| 2019/0092445 A1 * | 3/2019 | Bailey | B64C 11/001 |

OTHER PUBLICATIONS

FMX-4 Facetmobile www.youtube.com/watch?v=44kDq_PXvro (Year: 2012).*

(Continued)

*Primary Examiner* — Richard G Davis
(74) *Attorney, Agent, or Firm* — Davis Wright Tremaine LLP

(57) ABSTRACT

A high transport efficiency aircraft apparatus for precisely delivering a payload at a target area without stopping is disclosed. An aircraft is adapted to fly at low speed and less than 10 feet above ground level over the target area, with a delivery trajectory including a steep descent toward the target area and a steep ascent away from the target area. The aircraft includes a payload bay constructed to contain the payload within the aircraft, and a payload release mechanism adapted to release the payload from the payload bay when the aircraft flies over the target area, allowing the payload to fall and arrive unharmed at the target area unaided by an aerodynamic deceleration device.

12 Claims, 33 Drawing Sheets

(56) References Cited

OTHER PUBLICATIONS

Shaw, G. W., "Aerodynamic Characteristics of Thick Sharp-Edged Cropped Delta and Gothic Wings giving Low Lift-Dependent Drag" The Aeronautical Journal of the Royal Aeronautical Society, vol. 74, pp. 586-589 (Jul. 1970).
Wainfan, Barnaby, Neiubert, Hans, "Feasibility Study of the Low Aspect Ratio All All-Lifting Configuration as a Low-Cost Personal Aircraft", NASA LARC NAG-1-03054, Feb. 2004.
Ackerman, Evan, Koziol, Michael; In the Air With Zipline's Medical Delivery Drones ("The Blood Is Here"), IEEE Spectrum Magazine, May 2020 Issue.
Lapthorne, Peter; Experimental Studies On Circularly Towed Aerial Tethers, PhD Thesis School of Aerospace, Mechanical and Manufacturing Engineering at RMIT University.
Multiservice Helicopter Sling Load: Basic Operations And Equipment, Headquarters Department of the Army United States Marine Corps Department of the Navy Department of the Air Force United States Coast Guard.
Ackerman, Evan; Amazon's New Prime Air Drone Features a Weird Tailsitter Design, IEEE Spectrum.
Bowers, Ray L.; Tactical Airlift, Office of Air Force History United States Air Force Washington, D.C., 1983.

\* cited by examiner

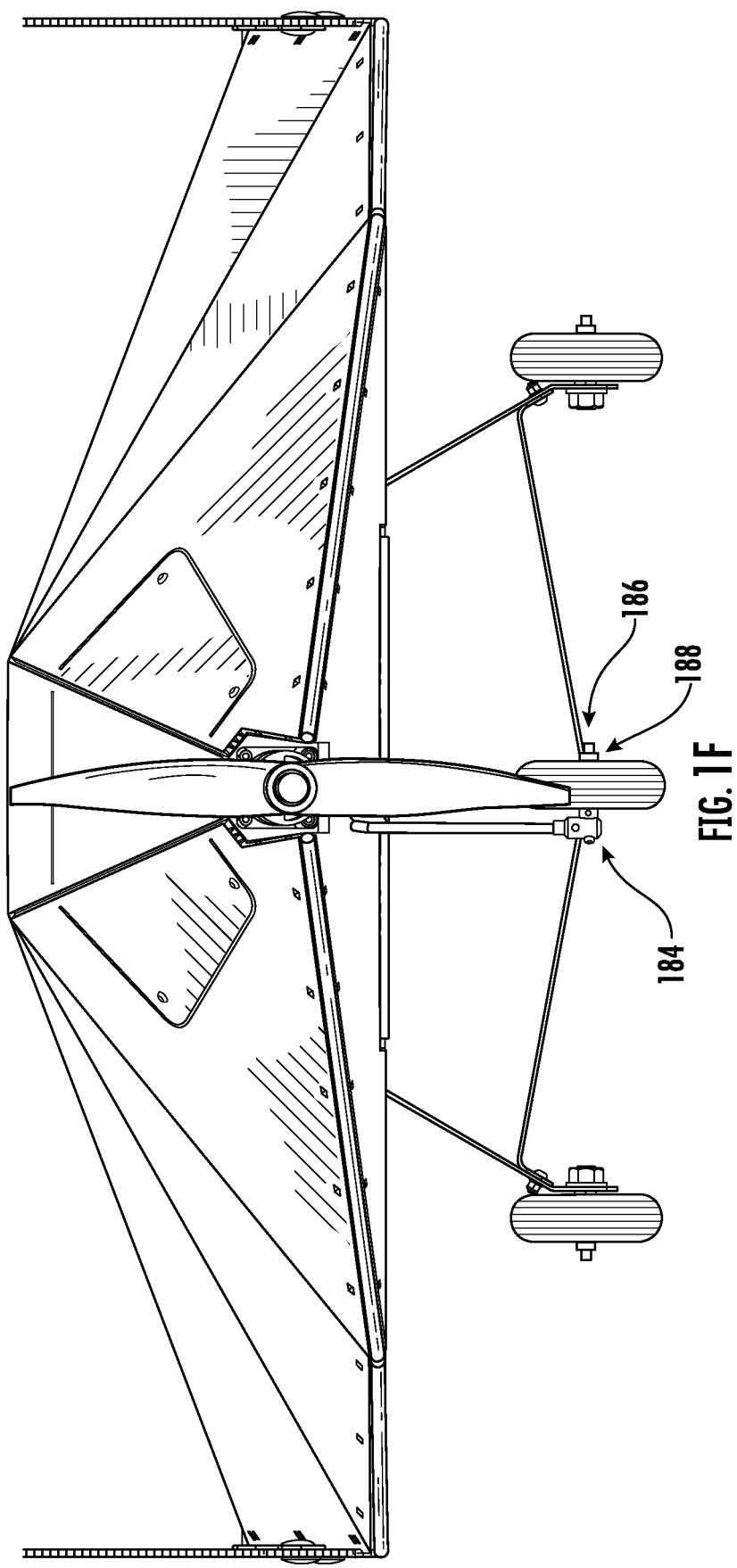

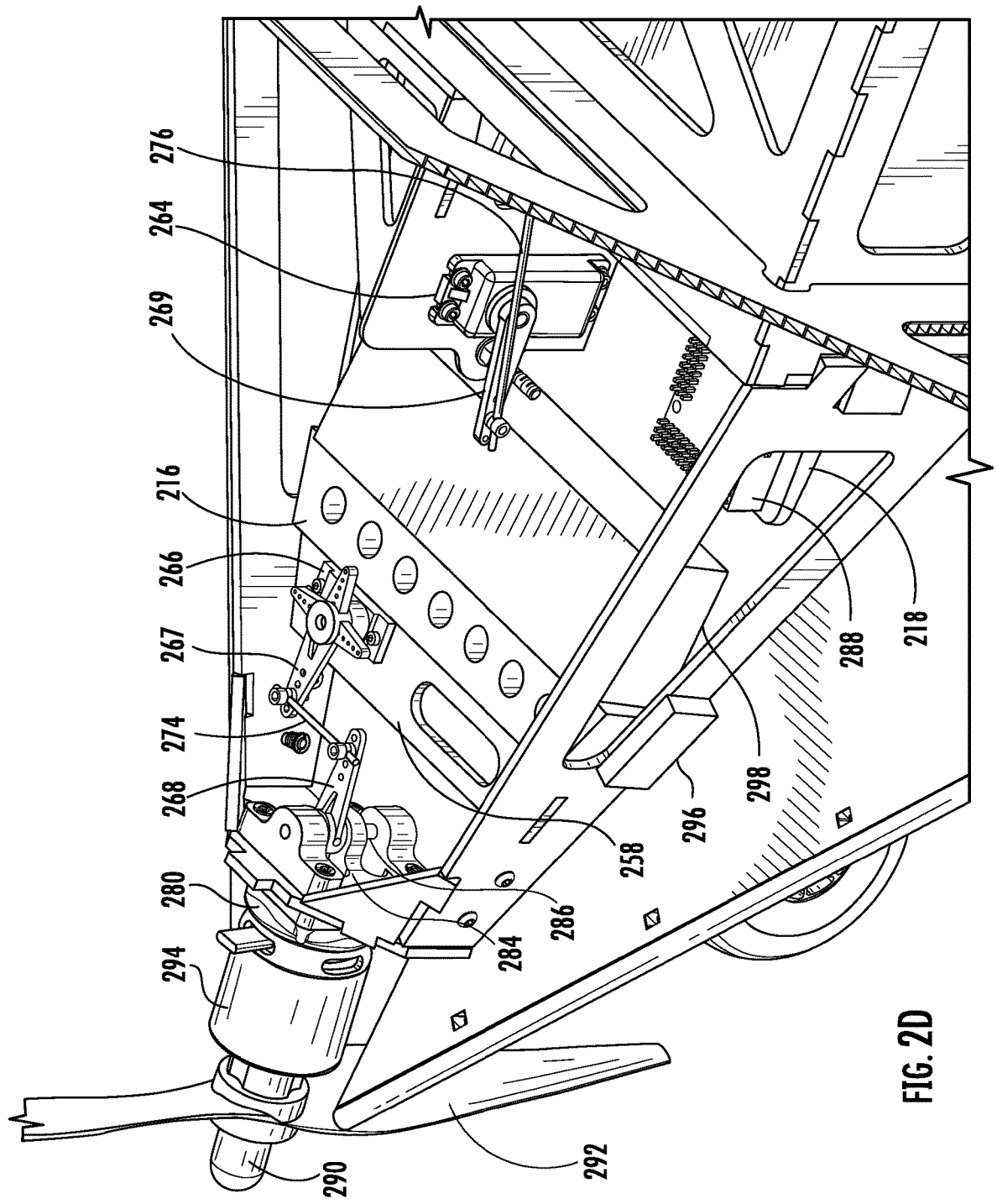

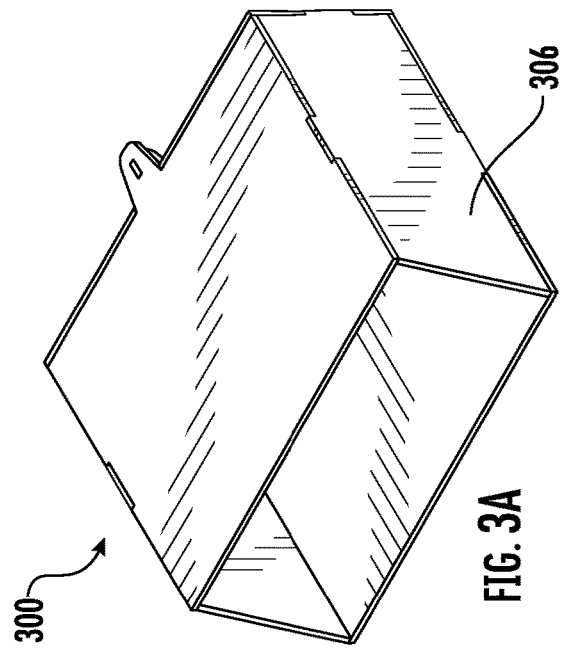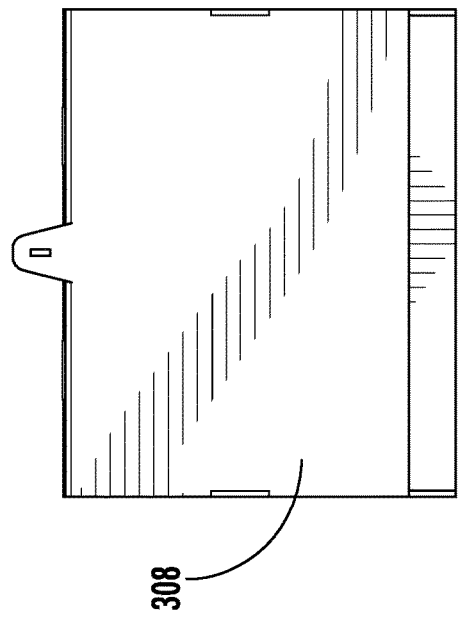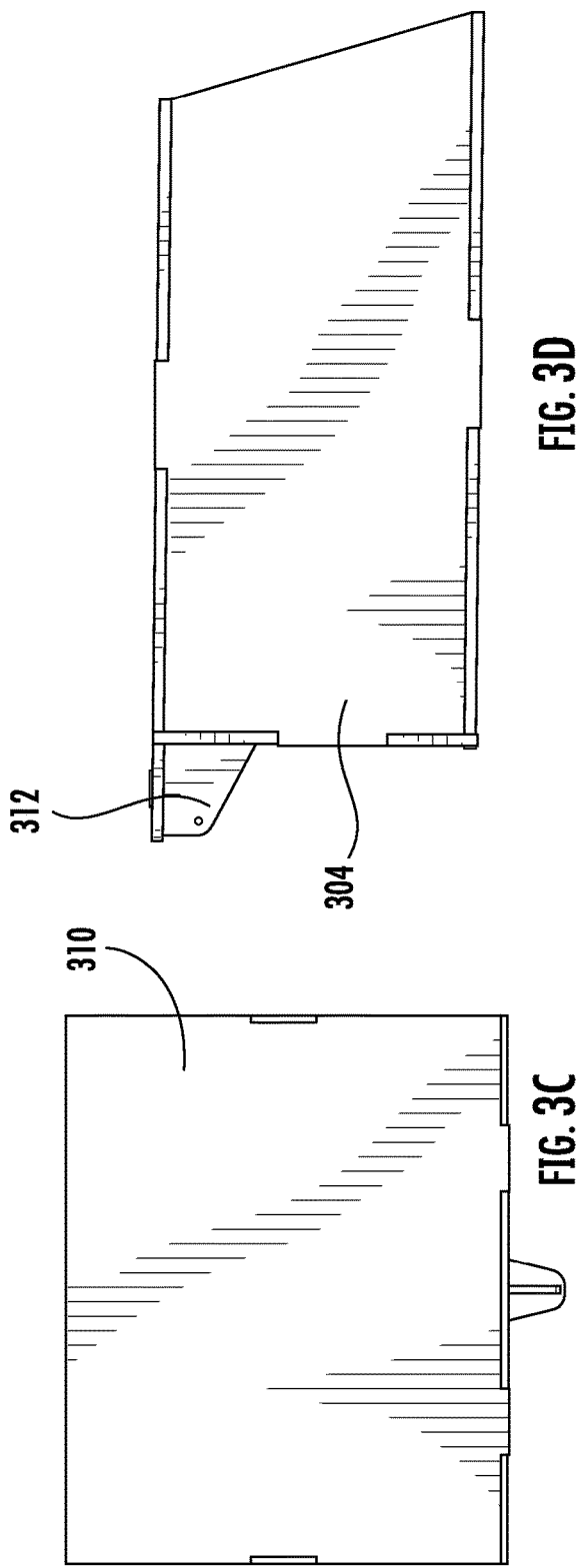

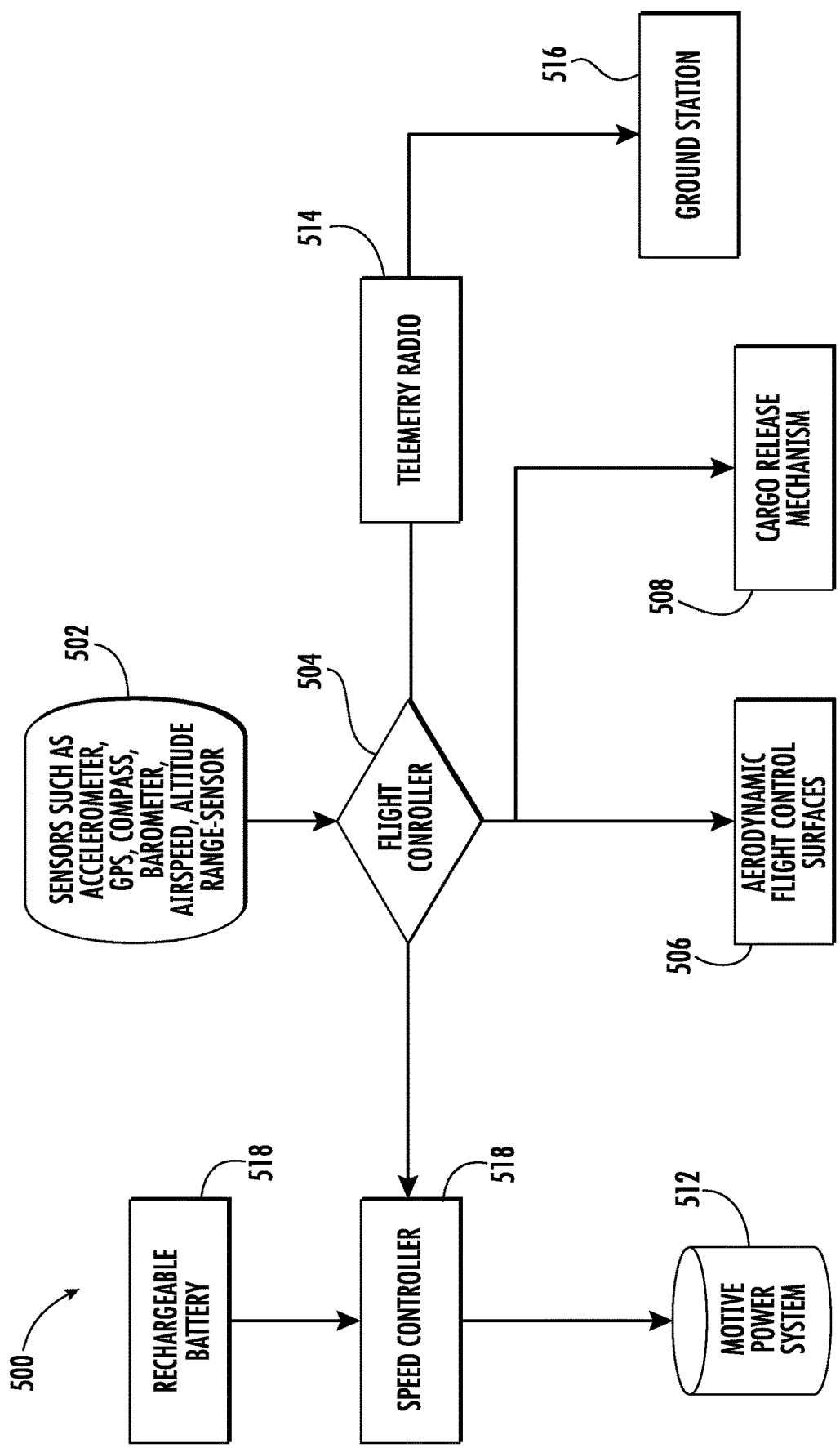

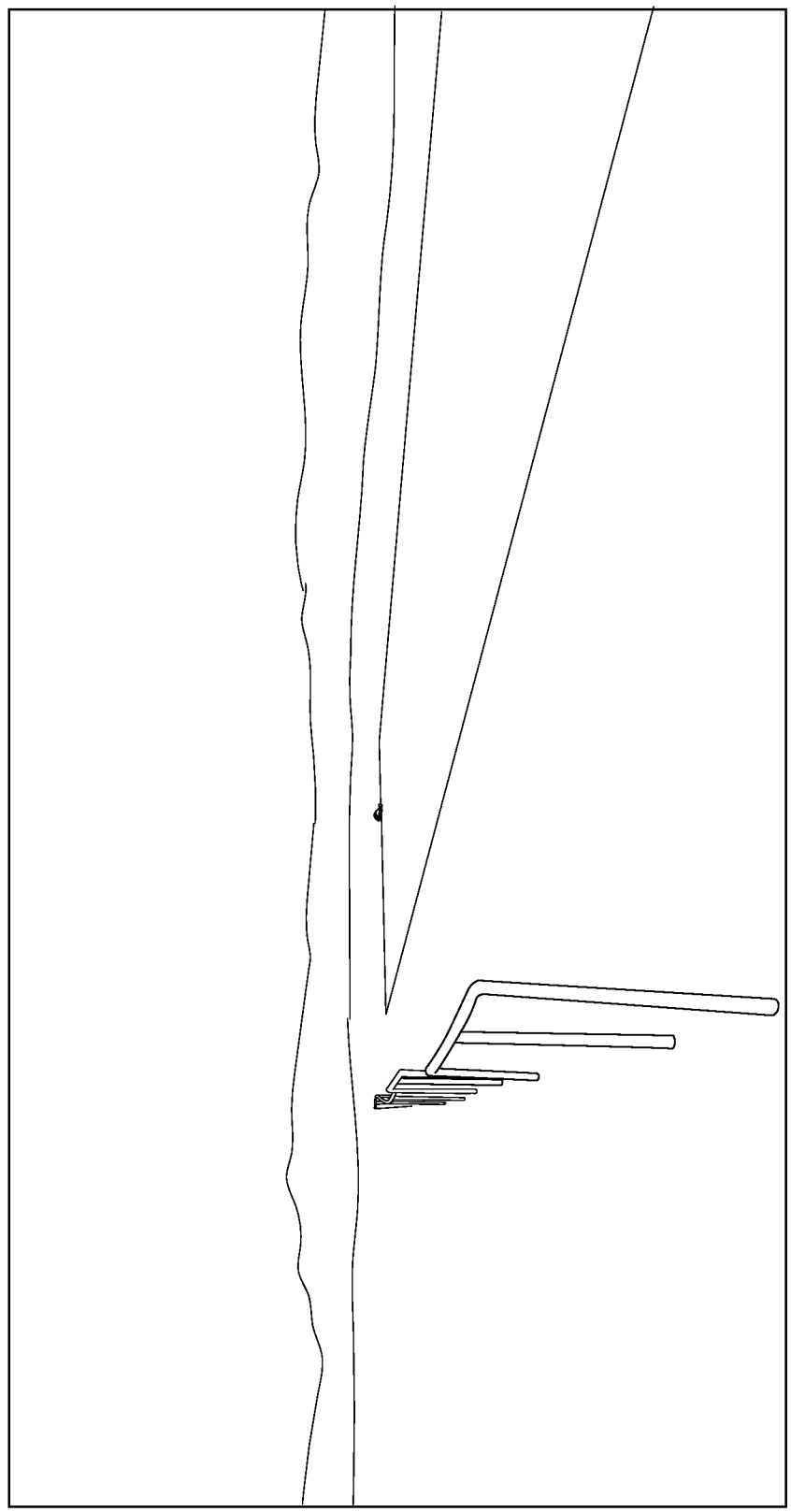

HIGH TRANSPORT EFFICIENCY AIRCRAFT APPARATUS, SYSTEMS AND METHODS TO PRECISELY DELIVER CARGO AT A POINT IN SPACE WITHOUT STOPPING

CROSS REFERENCE TO RELATED APPLICATIONS

This application claims the benefit of provisional patent application Ser. No. 62/882,471, filed Aug. 2, 2019.

BACKGROUND

1. Field of the Invention

The invention generally relates to low aspect ratio, lifting-body and other types of fixed-wing, gyrocopter, vertical takeoff and landing or other aircraft; cargo storage and release apparatus systems and methods; cargo packaging; and other apparatus methods and systems to utilize these aircraft to safely deliver air cargo to a specific point autonomously, partially autonomously, or under remote manual control.

2. Description of Related Materials

To reduce the complexity and length of the Detailed Specification, and to fully establish the state of the art in certain areas of technology, Applicant herein expressly incorporates by reference all the following materials identified in each numbered paragraph below. Any cite numbers referred to herein are set forth in the Information Disclosure Statement (IDS) filed contemporaneously with this application and incorporated by reference herein.

The related art shows the novel and non-obvious nature of the present invention including secondary considerations of non-obviousness such as the long-felt need and failure of others to achieve the present invention. All referenced materials are herein incorporated by reference in its entirety.

Conventional wisdom to maximize aircraft payload is to increase the length of the wings of a fixed wing aircraft. Therefore, not surprisingly, cargo aircraft and drones are known to have relatively long wings. However, this prevents the use of these larger vehicles from small areas or in congested spaces. Still further, these fixed-wing aircraft are not well suited to place a delivery at a specific delivery coordinate, because they must travel forward through the air at relatively high speeds to maintain lift.

Conventional wisdom for autonomous delivery drones is to utilize a quadcopter or vertical take off and landing (VTOL) design that can hover or land at a specific delivery coordinate during delivery in order to place an item. However, these types of aircraft are not that efficient when traveling from the point of departure to the delivery location and back. Still further, to the extent these aircraft land or remain stationary for an extended period, there is increased probability of damage, vandalism or theft.

There is a need to maximize, optimize, or improve aircraft payload, payload to drag ratio, or transport efficiency while minimizing the overall width or wingspan of the aircraft.

There is a need to utilize aircraft with efficient cruise flight characteristics for precise placement of items at or very near a coordinate or target area.

There is a need to utilize aircraft for precise placement of items at or very near a coordinate area or target area without stopping.

The following documents provide additional background:

1) Shaw, G. W., "Aerodynamic Characteristics of Thick Sharp-Edged Cropped Delta and Gothic Wings giving Low Lift-Dependent Drag," The Aeronautical Journal of the Royal Aeronautical Society, Vol. 74, Pages 586-589 (July 1970).

2) Barnaby Wainfan and Hans Neiubert, "Feasibility Study of the Low Aspect Ratio All All-Lifting Configuration as a Low-Cost Personal Aircraft", NASA LARC NAG-1-03054, February 2004, accessed Oct. 24, 2006.

Applicant believes that the material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), Applicant will amend the specification to expressly recite the essential material that is incorporated by reference as allowed by the applicable rules.

SUMMARY OF THE INVENTION

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

In that regard, the use of the word "coupled" or "connected" implies that the elements may be directly connected or may be indirectly connected or coupled through one or more intervening elements unless it is specifically noted that there must be a direct connection.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

Headings, sections, and other similar designations are provided for the convenience of the reader, and should not be used to limit, divide, or partition the teachings of the variously claimed aspects of the inventions.

The aspects, features, and advantages will be apparent to those artisans of ordinary skill in the art from the DETAILED DESCRIPTION and DRAWINGS, and from the CLAIMS.

However, without attempting to characterize or limit the scope of inventions as they are described and claimed, some of the advantages of the various inventions are summarized below.

It is an object of the invention to provide apparatus, systems and methods for the efficient and safe delivery of payload using aircraft.

It is yet another (and optionally independent) object of the invention to reduce the wingspan of a fixed-wing or lifting body aircraft while maximizing the payload, or payload to drag ratio, that can be carried by the aircraft.

It is yet another (and optionally independent) object of the invention to improve or maximize aircraft payload (or payload to drag ratio) while minimizing the overall width or wingspan of the aircraft.

It is yet another (and optionally independent) object of the invention to provide an airframe having specific metrics for drag per useful load, or transport efficiency.

It is yet another (and optionally independent) object of the invention to provide an airframe that is easy to manufacture.

It is yet another (and optionally independent) object of the invention to provide an airframe that is economical to produce.

It is yet another (and optionally independent) object of the invention to provide an airframe having the ability to fly at a low airspeed and an angle of attack of greater than 15 degrees.

It is yet another (and optionally independent) object of the invention to provide an airframe having the ability to fly at a low airspeed and an angle of attack of about, or greater than 30 degrees.

It is yet another (and optionally independent) object of the invention to provide for the storage and release of payload from an aircraft.

It is yet another (and optionally independent) object of the invention to precisely and safely deliver payload without need of aerodynamic decelerator (e.g., streamer, parachute, etc.).

It is yet another (and optionally independent) object of the invention to utilize aircraft with efficient cruise flight characteristics for precise placement of items at or very near a coordinate or target area.

It is yet another (and optionally independent) object of the invention to utilize aircraft to precisely place items at or very near a coordinate area or target area.

It is yet another (and optionally independent) object of the invention to utilize aircraft for precise placement of items at or very near a coordinate area or target area without stopping.

It is yet another (and optionally independent) object of the invention to utilize aircraft for precise placement of items at or very near a coordinate area or target area without stopping with a high angle of attack approach at low altitude over a target area.

It is yet another (and optionally independent) object of the invention to create, maintain, store or update a database of acceptable takeoff and landing areas.

It is yet another (and optionally independent) object of the invention to create, maintain, store or update a database of acceptable delivery areas (e.g., basketball courts, parks, helipads, clearings, etc.).

It is yet another (and optionally independent) object of the invention to determine a delivery trajectory over a target delivery point.

It is yet another (and optionally independent) object of the invention to provide for terminal guidance of the aircraft either over a delivery point or when approaching to a landing area.

It is yet another (and optionally independent) object of the invention to precisely deliver payload to a specific point, near a specific point, or within or near a specific area on the ground.

It is yet another (and optionally independent) object of the invention to safely deliver cargo or payload such that the impact of the cargo or payload on the ground has no adverse effects (or negligible adverse effects) on the cargo or payload.

At least one of the above listed, unlisted, and other objects of the invention may be achieved by utilizing an aircraft capable of slow flight and/or high angle of attack ("AOA") at low altitude, causing the aircraft to fly a delivery trajectory over a target delivery point for the payload, and causing the payload to be released such that it arrives at or very close to the target delivery point.

The aircraft may be a low aspect ratio aircraft, a lifting body aircraft, a gyrocopter, a quadcopter, or any other type of aircraft.

The aircraft may have specific metrics for useful load to drag ratio, or transport efficiency (e.g., substantially within or about the range 3.5 to 4.5 units of useful load per unit drag, or higher).

The aircraft may have a payload bay. The payload bay may be adapted to house a cassette containing the payload.

The aircraft may fly the delivery trajectory at an angle of attack at or in excess of 15 degrees. Alternatively, the aircraft may fly the delivery trajectory at an angle of attack of approximately 30 degrees, or in excess of 30 degrees.

The delivery trajectory may be pre-programmed to drop on or near a specific geographic coordinate(s) or within a specific geographic area(s).

The delivery trajectory may be determined or based on utilizing an on-board camera within the aircraft and local or remote image recognition to locate the desired target delivery point. The desired target delivery point may be identified utilizing a target placed on the ground.

Terminal guidance or piloting may be autonomous. Alternatively, the terminal guidance may be provided by line-of-sight operator at delivery point or first-person view ("FPV") operator using downlinked data.

The above listed objects, and summary of how the objects might be achieved, are intended to assist with the understanding of the invention(s), and shall not be used to limit the scope of claims as done in Pacing Technologies, LLC v. Garmin International, Inc., No. 14-1396 (Fed. Cir. Feb. 18, 2015).

BRIEF DESCRIPTION OF THE SEVERAL VIEWS OF THE DRAWINGS

A more complete understanding of the present invention may be derived by referring to the detailed description when considered in connection with the following illustrative figures. In the figures, like reference numbers refer to like elements or acts throughout the figures.

FIG. 1F depicts a front view of a lifting-body airframe that may be used by various forms of the invention.

FIG. 2D depicts a back left isometric view of the internal structure of the front portion of the lifting-body airframe that may be used by various forms of the invention.

FIG. 3A depicts an isometric view of a payload cassette assembly that may be used by various forms of the invention.

FIG. 3B depicts a top view of a payload cassette assembly that may be used by various forms of the invention.

FIG. 3C depicts a bottom view of a payload cassette assembly that may be used by various forms of the invention.

FIG. 3D depicts a left view of a payload cassette assembly that may be used by various forms of the invention.

FIG. 5 depicts a diagram showing one possible relationship between the circuits, radios, and telemetry that may be used by various forms of the invention.

FIG. 6C depicts a lifting-body aircraft that may be used by various forms of the invention taking off.

Figure 1A:
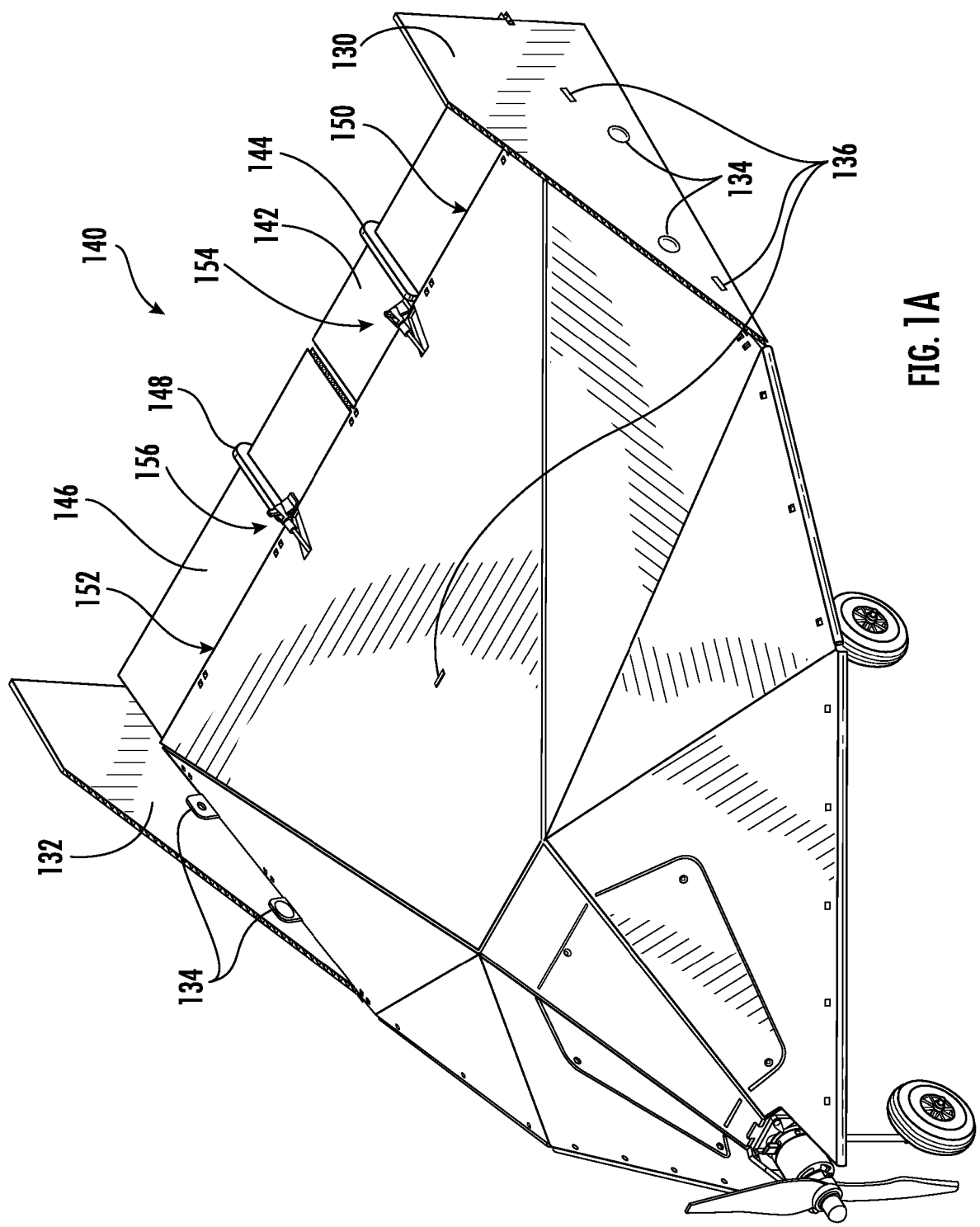
FIG. 1A depicts an isometric view of a lifting-body airframe that may be used by various forms of the invention.

Elements and acts in the figures are illustrated for simplicity and clarity, and the drawings have not necessarily been rendered according to any sequence, embodiment, or form of the invention, and their simplicity should not use to limit the scope of the invention.

DETAILED DESCRIPTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions are not limited to the examples that are described below.

In addition to the description provided above, additional information is provided in the file history associated with this application and the associated provisional application referenced above (e.g., as an Appendix to the Specification, Information Disclosure Statement, Transmittal Letter, etc.); those materials are hereby incorporated by reference in its entirety.

I. CONSTRUCTION METHODS

The vehicles and components described herein or utilized in the various forms of the invention may be constructed using any method. Some or all the components may be cut out of panels (e.g., beech wood, polypropylene copolymer, metal, composite, etc.) into various parts. These prefabricated panels may be cut into the various parts by die cutting, laser cutting, router, or any other method. The various parts may then be taped together over an internal frame, using cutouts (e.g., slots, etc.) to align the parts onto features (e.g., tabs, etc.) present on the internal structure or frame of the aircraft. The frame may be constructed similarly out of pre-fabricated materials (e.g., balsa, plywood, etc.) including castellated location-alignment tabs. The parts of the internal frame may be adhered (e.g., epoxied, etc.) into a rigid structure. Any gaps in skin formed at the plate seams may be covered (e.g., with a plastic tape, etc.), filled, or otherwise removed for aerodynamic performance. Alternatively, in various forms of the invention, other manufacturing techniques (e.g., milling, routing, injection molding, 3D printing, vacuum forming, or any other suitable construction method) may be used to fabricate some or all the various components of the invention.

II. AIRFRAME

Various forms of the invention may utilize different types of airframes. For purposes of illustration and without limitation, some example forms of the invention are 295 provided below.

II.A. Lifting Body Airframe.

In various forms of the invention, the aircraft includes a low-aspect-ratio all-lifting (lifting body) airframe capable of flight at airspeeds of the order of 30 knots and angles of attack in excess of 15 degrees.

Figure 1B:
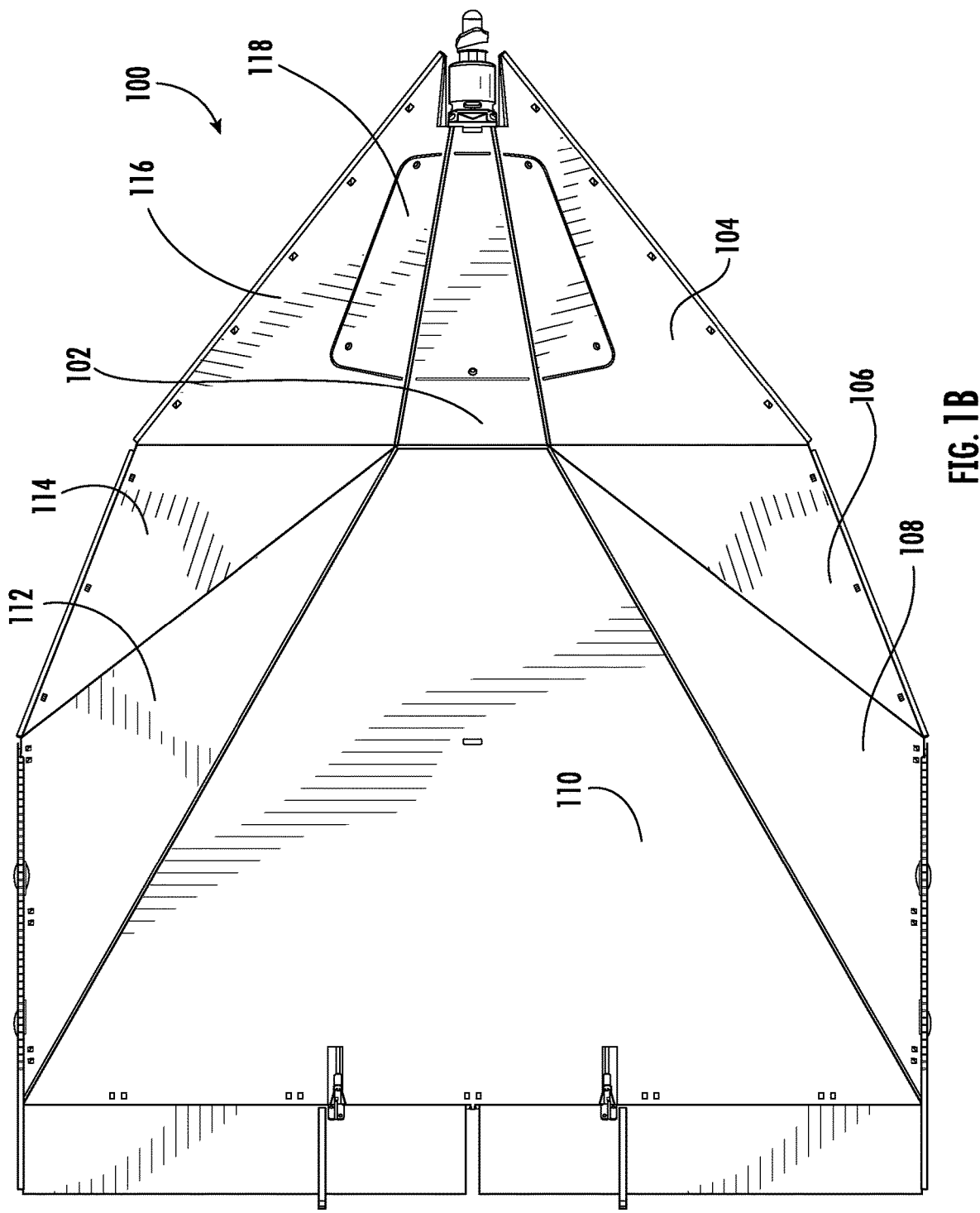
FIG. 1B depicts a top view of a lifting-body airframe that may be used by various forms of the invention.

With reference to FIG. 1B, the lifting airframe body may include a faceted top surface 100. The faceted top surface 100 may include several facets. In various forms of the invention the faceted top surface 100 may include a top forward facet 102, a top right facet 104, a top mid right facet 106, a top aft right facet 108, a top aft facet 110, a top aft left facet 112, a top mid left facet 114, and a top left facet 116. Other facet configurations or shapes may be utilized. Alternatively, in some forms of the invention, the facet surface may be smoothed so that it does not have visible facet faces.

Figure 2A:
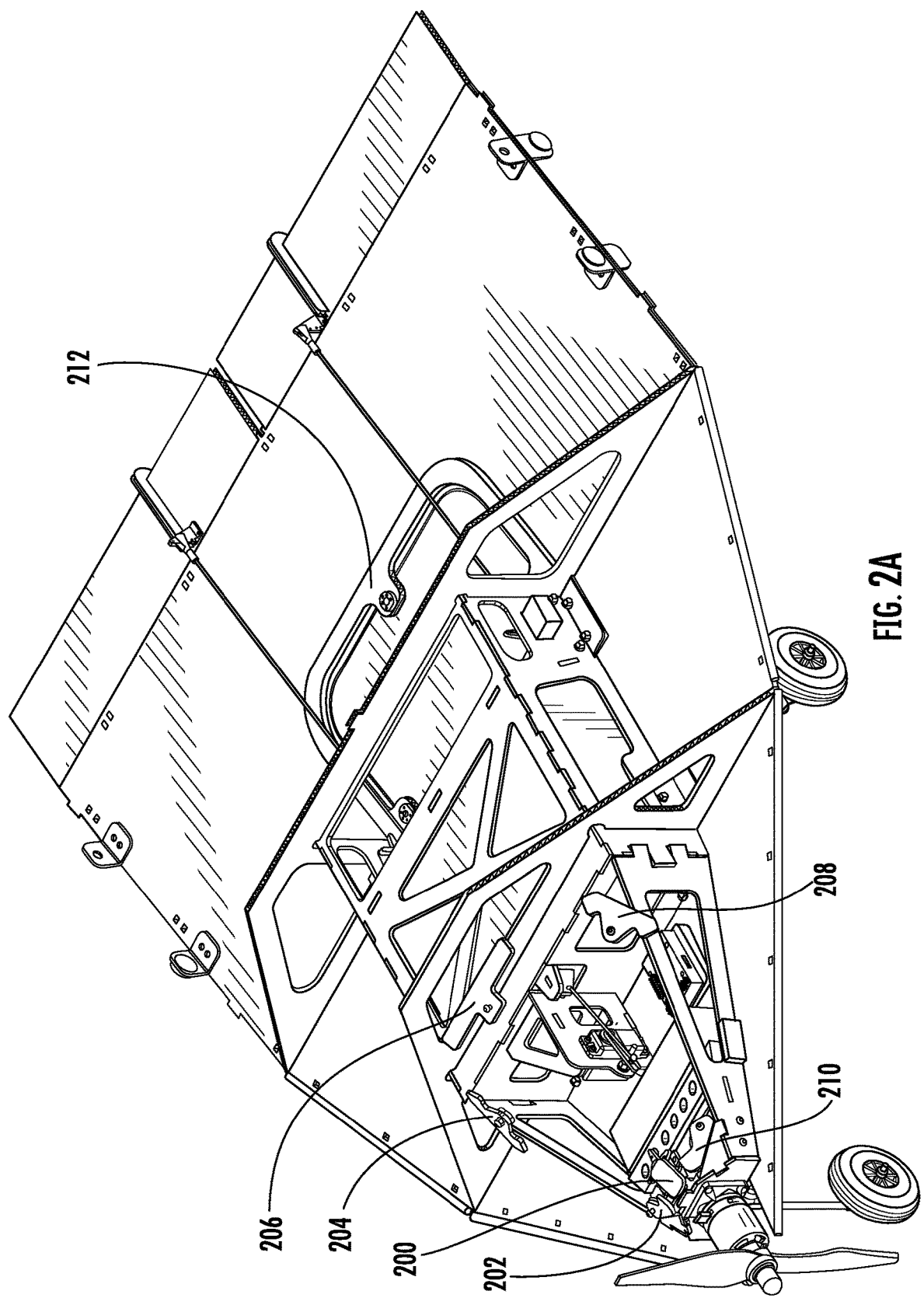
FIG. 2A depicts a front left isometric view of the internal structure of the lifting-body airframe that may be used by various forms of the invention.

With reference to FIG. 1B, in various forms of the invention, there may be a top forward hatch 118 that provides access to the internal structure of the airframe. The top hatch may be attached to the airframe in several ways. With reference to FIG. 2A, in various forms of the invention, a forward hatch forward center tab 200, a forward hatch right side land 202, a forward hatch aft right side land 204, a forward hatch aft center land 206, a forward hatch aft left side land 208, and a forward hatch left side land 210 may be used in conjunction with fasteners (e.g., nut plates, screws, nuts, etc.) to secure the hatch to the airframe.

Figure 1C:
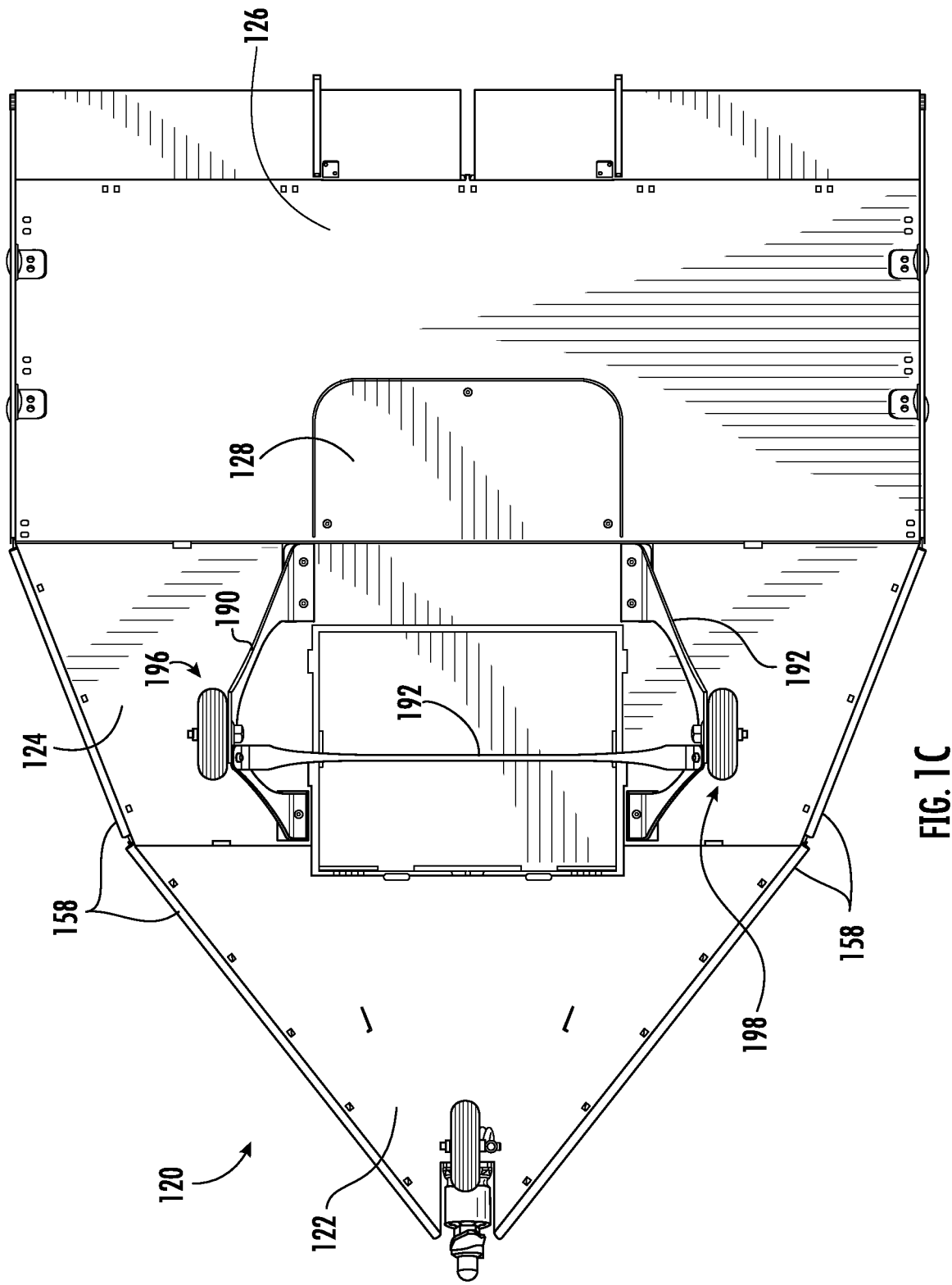
FIG. 1C depicts a bottom view of a lifting-body airframe that may be used by various forms of the invention.

With reference to FIG. 1C, the lifting airframe body may include a faceted bottom surface 120. The faceted bottom surface 120 may include several facets. In various forms of the invention, the faceted bottom surface 120 may include a bottom forward facet 122, a bottom mid facet 124, and a bottom aft facet 126. Other facet configurations or shapes may be utilized. Alternatively, in some forms of the invention, the facet surface may be smoothed so that it does not have visible facet faces.

With reference to FIG. 1C, in various forms of the invention, there may be a bottom aft hatch 128 that provides access to the internal structure of the airframe. The bottom aft hatch may be attached to the airframe in several ways. With reference to FIG. 2A, in various forms of the invention, an aft hatch land 212 may be used in conjunction with fasteners (e.g., nut plates, screws, nuts, etc.) to secure the hatch to the airframe.

With reference to FIG. 1A, the lifting airframe body may include fins or other aerodynamic features. In various forms of the invention, the airframe includes a left fin 130, and a right fin 132. The left fin 130 may be attached to the airframe with fin anchors or brackets and rivets or other hardware 134. Alternatively, fins may be attached with other types of brackets, hardware, adhesives, tapes, and/or tab and slot construction 136.

With reference to FIG. 1C, the lifting airframe body may include rounded leading edges on the forward-facing edges of the airframe. In various forms of the invention, the airframe includes rounded facet edges 158. These edges may be formed by attaching dowels to the leading edges of the airfoil where the top facet surfaces meet the bottom facet surfaces, or they may be formed by sanding or rounding the material that forms the airfoil during or after the manufacturing process.

With reference to FIG. 1A, the lifting airframe body may include several control surfaces 140. In various forms of the invention, the airframe includes a left elevon 142, and a right elevon 146. The airframe may also include a left elevon stiffener 144, and a right elevon stiffener 148. The control surfaces may be attached to the airframe with hinges. For example, left elevon 142 may be attached with left elevon hinge 150, and right elevon 146 may be attached with right elevon hinge 152. A left elevon control horn 154 may be attached to the left elevon 142, and a right elevon control horn 156 may be attached to the right elevon 146. The hinges may be constructed by scoring the top or bottom skin of the aircraft or may be any other type of material or item that provides the proper functionality.

In various forms of the invention, fewer or greater number of top or bottom facets may be used. Still further, in forms of the invention different number or types of control surfaces, control surface stiffeners, or access hatches, fins, or other aerodynamic features that may be included or omitted. Furthermore, in some forms of the invention, any faceted surfaces may be smoothed.

In various forms of the invention, the area inside the airframe is adapted to provide a relatively useful load per unit of drag, or transport efficiency, and houses the electronics, and a payload bay.

In various forms of the invention, the internal structure may provide a skeleton that supports the top facets 100 and/or bottom facets 200. With reference to FIG. 2C, the lifting airframe may include internal bulkheads, and/or sidewalls. In various forms of the invention, the airframe includes an "A" bulkhead 220, a "B" bulkhead 222, and a "C" bulkhead 224. A left nose gusset 226 and a right nose gusset 228 may be used to help secure the "A" bulkhead 220 to a left sidewall 230 and a right sidewall 232, respectively. In various forms of the invention, fewer or greater number of bulkheads, gussets, and/or sidewalls may be used.

In various forms of the invention, the internal structure includes a payload bay that is customized depending on the application. For purposes of illustration and without limitation, with reference to FIGS. 2B and 2C, the airframe may include an internal payload bay adapted for package delivery. In various forms of the invention, the internal payload bay includes a left payload bay wall 234, a right payload bay wall 236, a payload bay roof 238, a payload bay forward bulkhead 240, and a payload bay aft bulkhead 242.

Figure 2B:
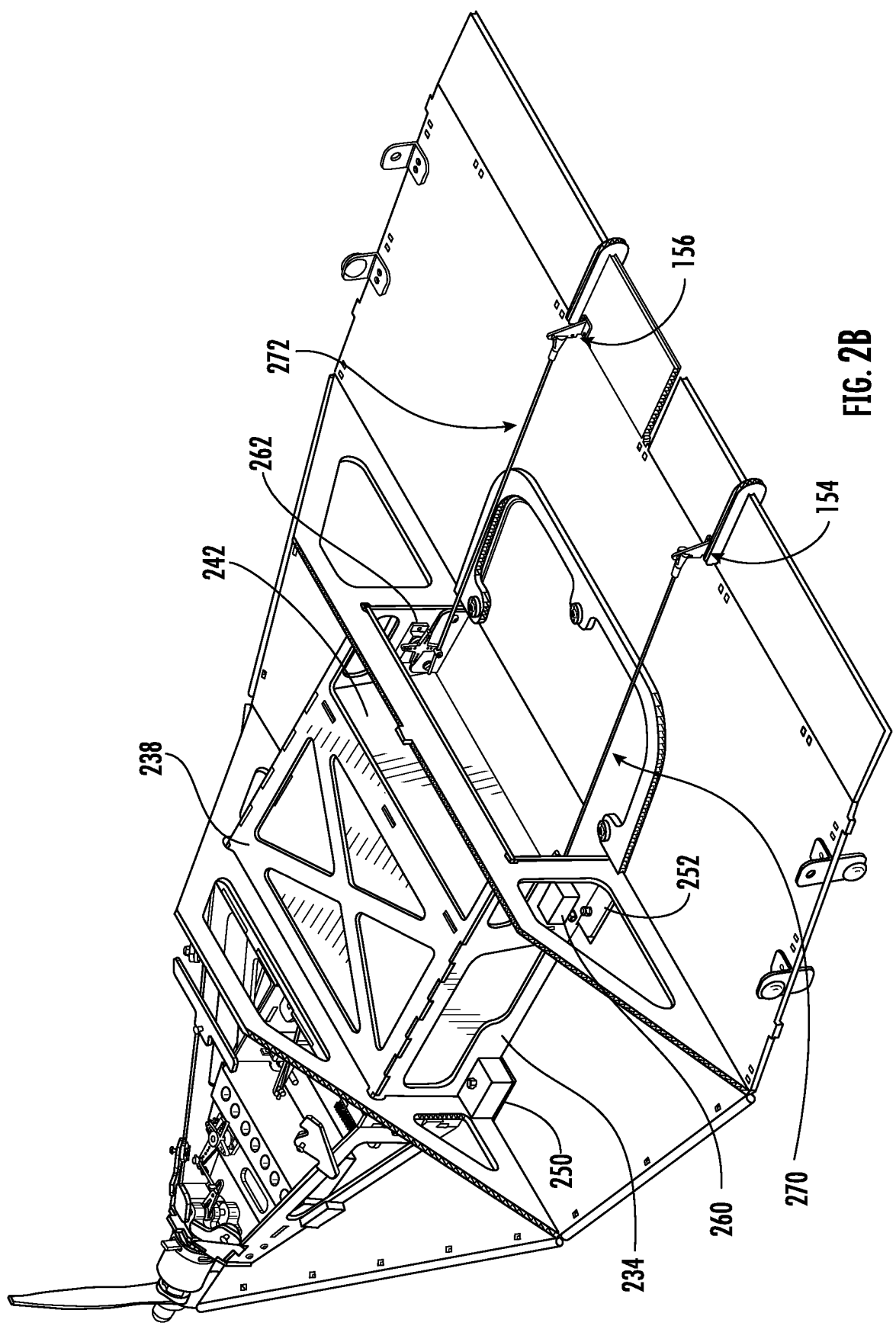
FIG. 2B depicts a back left isometric view of the internal structure of the lifting-body airframe that may be used by various forms of the invention.
Figure 2C:
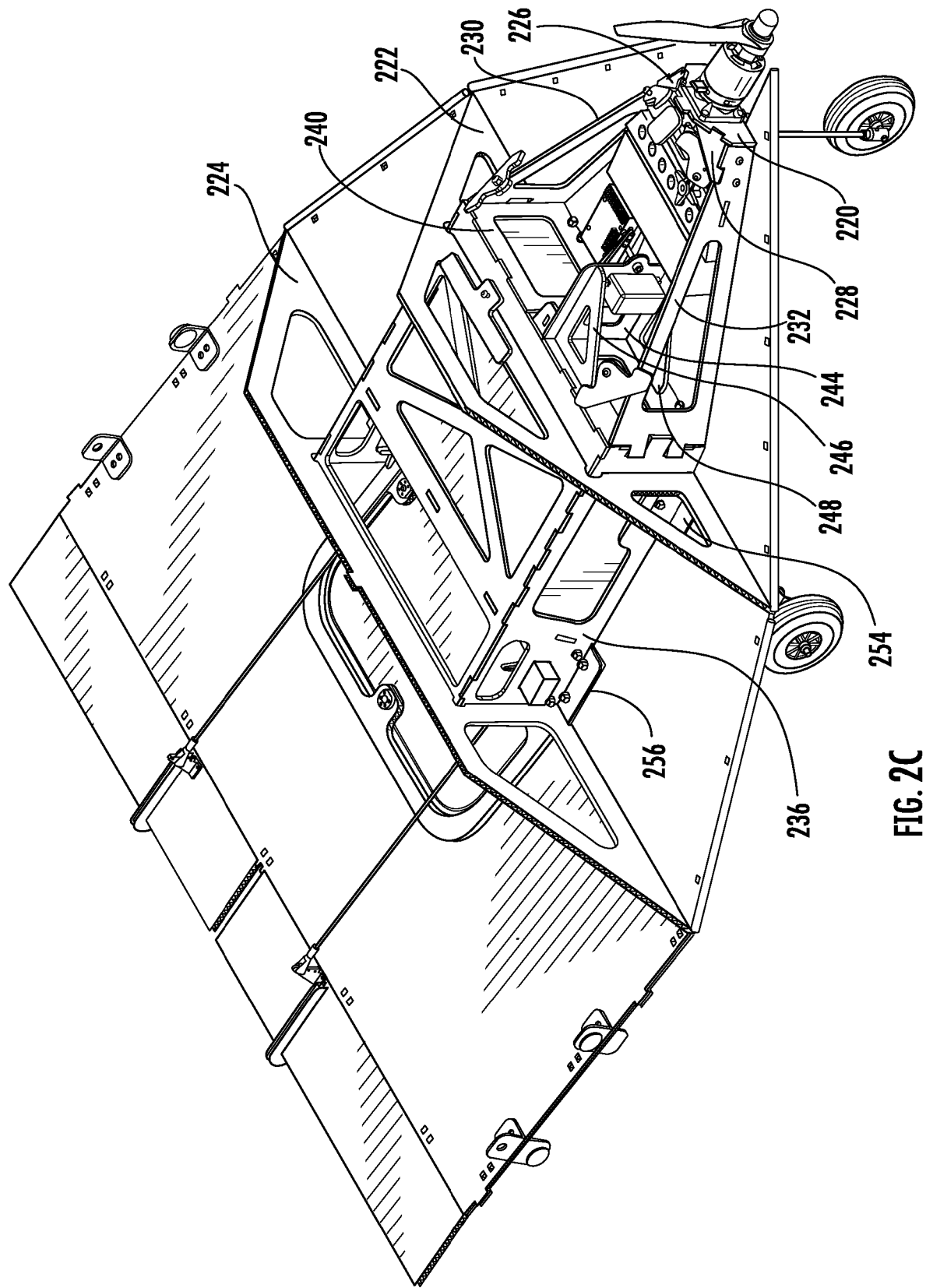
FIG. 2C depicts a front right isometric view of the internal structure of the lifting-body airframe that may be used by various forms of the invention.
Figure 3E:
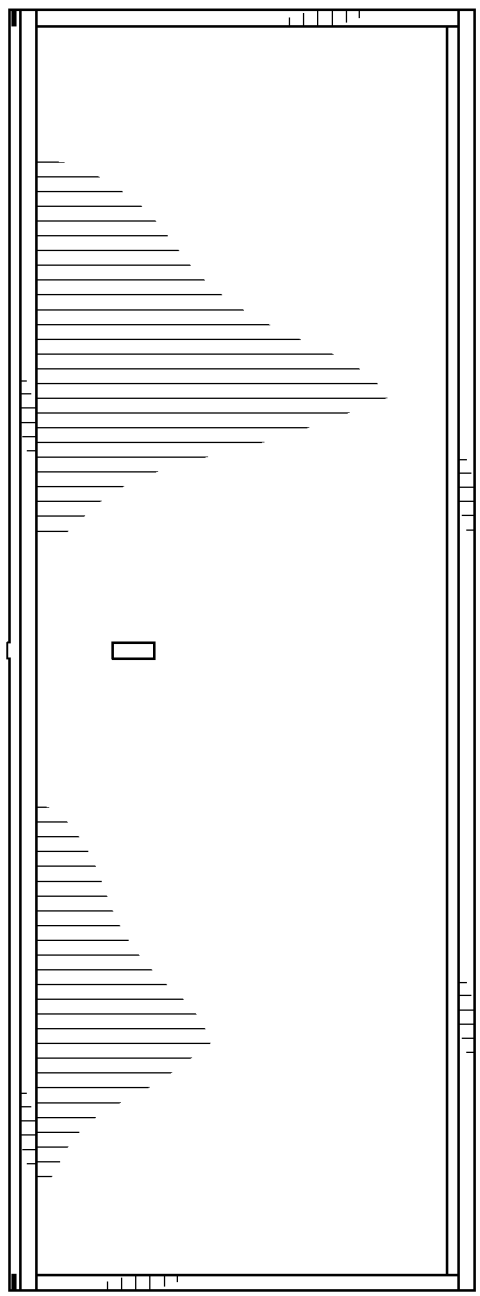
FIG. 3E depicts a front view of a payload cassette assembly that may be used by various forms of the invention.
Figure 3F:
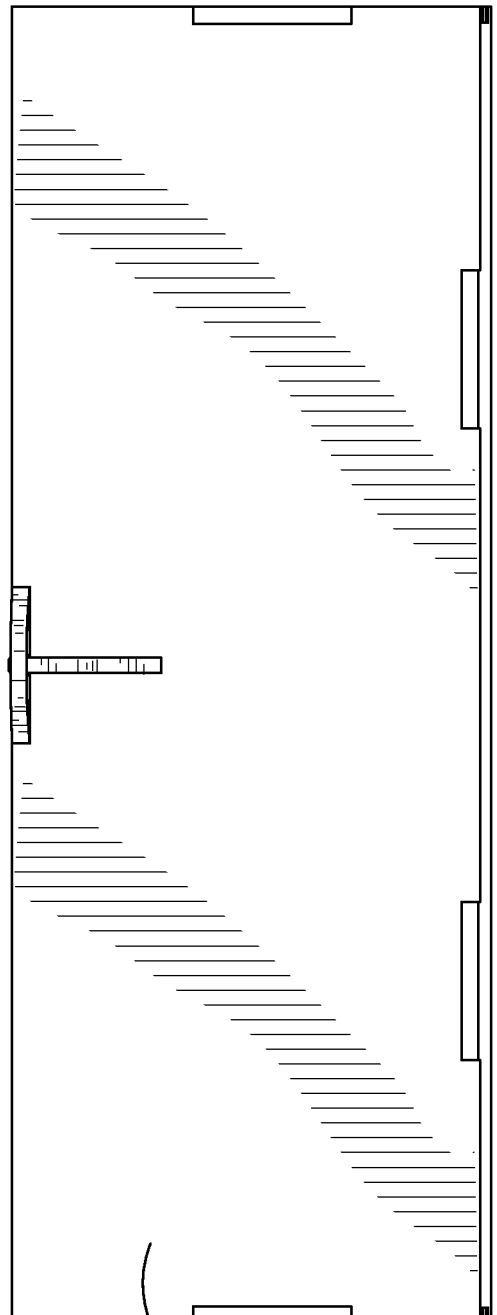
FIG. 3F depicts a back view of a payload cassette assembly that may be used by various forms of the invention.

With reference to FIG. 2B, in various forms of the invention, the left payload bay wall 234 may provide an area to mount a left elevon control servo 260 and the right payload bay wall 236 may provide an area to mount a right elevon control servo 262. Alternatively, left and right elevon control servos 260 and 262 may be mounted in other locations. Left elevon control servo 260 may be connected to the left elevon control horn 154 with a left elevon control rod 270. Similarly, right elevon control servo 262 may be connected to the right elevon control horn 156 with a right elevon control rod 272.

With reference to FIGS. 2A and 2C, in various forms of the invention, the left sidewall 230 may interlock with the left payload bay wall 234 using tabs, and the right sidewall 232 may interlock with the right payload bay wall 236 using tabs.

With reference to FIGS. 2C and 2D, in various forms of the invention, a payload cassette servo plate 244 is attached to the payload bay forward bulkhead 240, and it is braced with an upper payload cassette servo plate gusset 246, and a lower payload cassette servo plate gusset 248. The payload cassette servo plate 244 may provide an area to mount a payload cassette servo 264. Various forms of the invention may also include other items (e.g., a flight controller levelling wedge 218, a foam battery block 216, etc.).

Various forms of the invention may include a landing gear. For example, a tricycle configuration may be used, or forms of the invention may have other landing gear configurations (e.g., no landing gear, skids, single wheel, tailwheel, skis, floats, etc.).

Figure 1D:
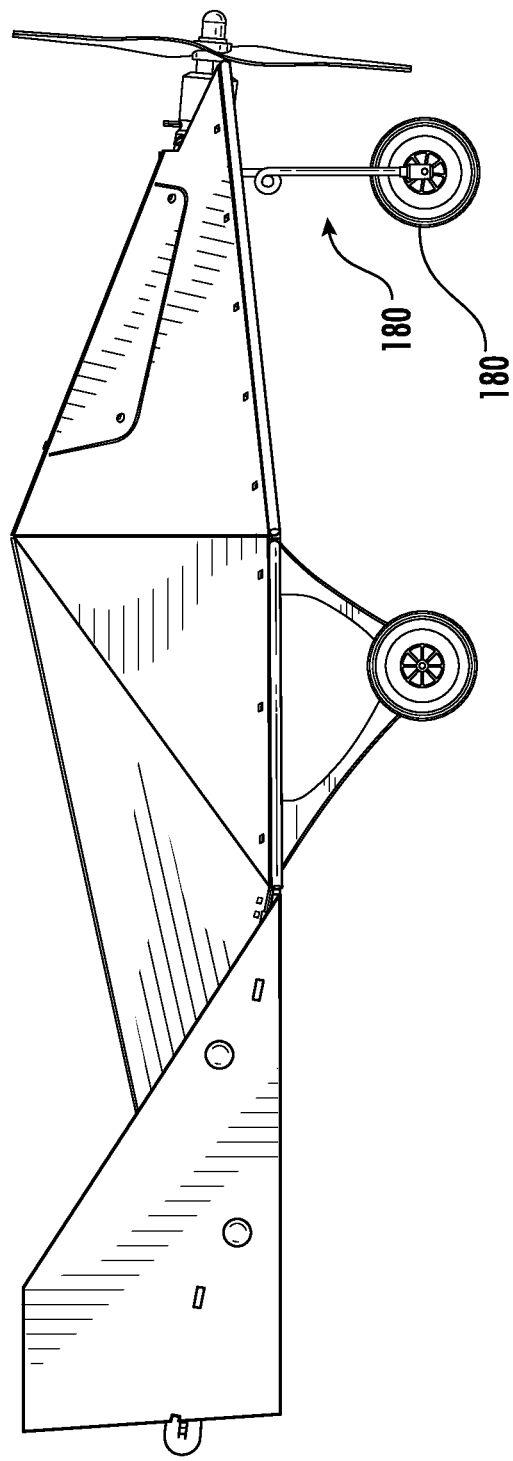
FIG. 1D depicts a left view of a lifting-body airframe that may be used by various forms of the invention.
Figure 1E:
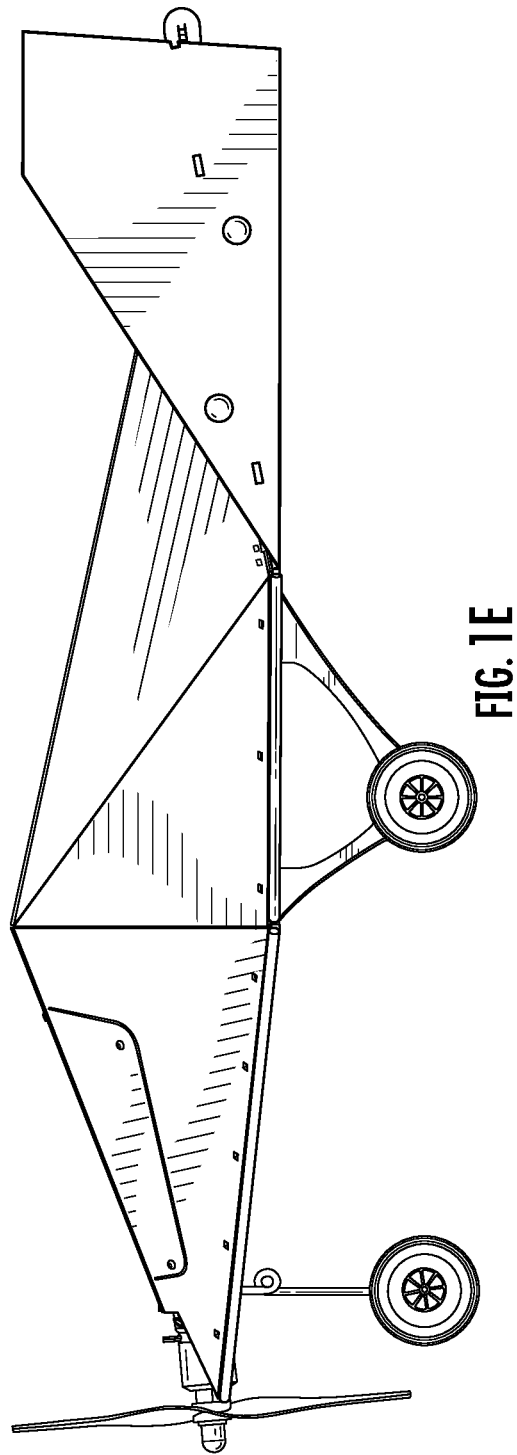
FIG. 1E depicts a right view of a lifting-body airframe that may be used by various forms of the invention.
Figure 1G:
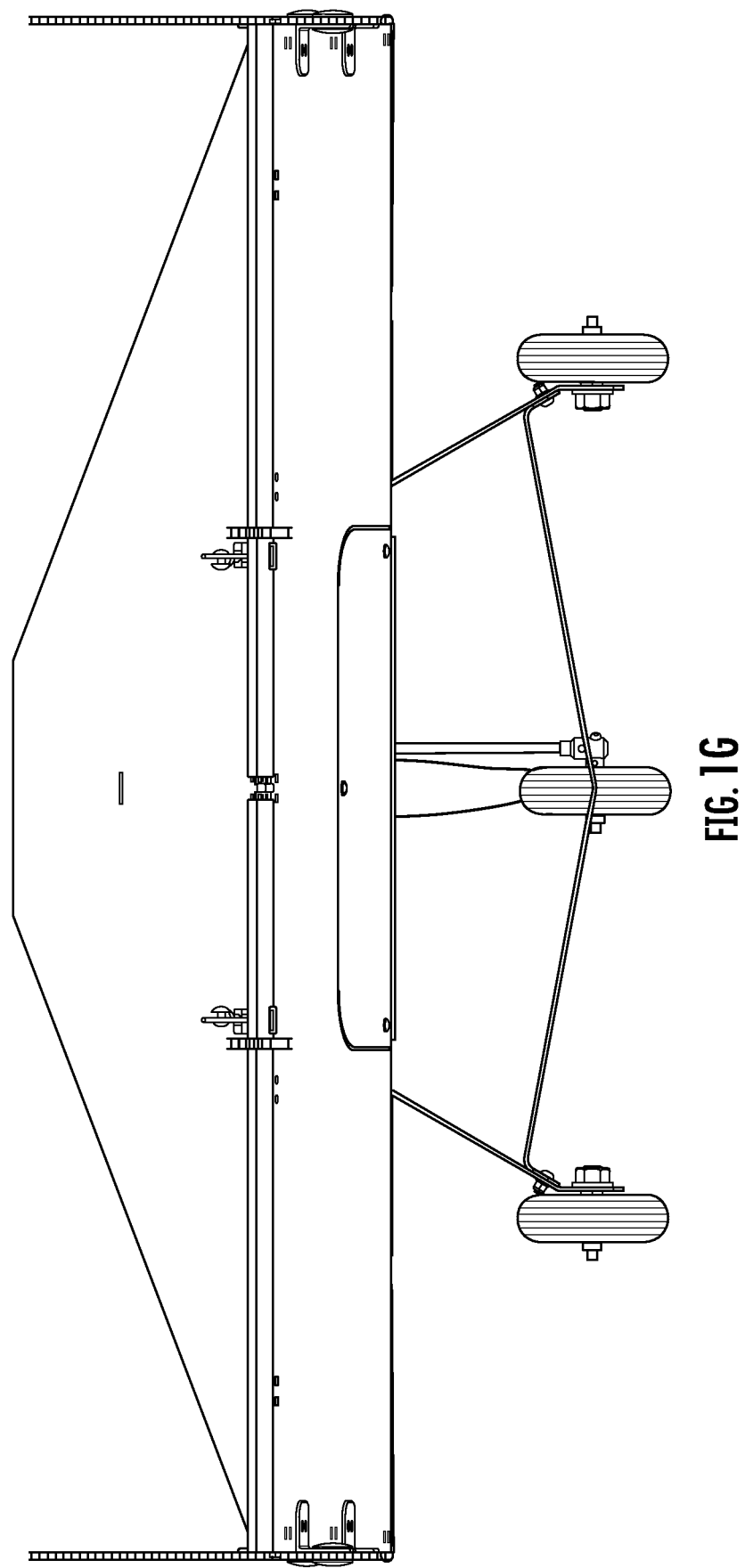
FIG. 1G depicts a back view of a lifting-body airframe that may be used by various forms of the invention.

With reference to FIGS. 1D, 1F and 2D, in forms of the invention with a nose gear 180, there may be a nose gear elbow lug 184, a nose gear axel 186 on which the nose wheel 182 is placed, and at least one shaft lock ring 188 to secure the nose wheel 182 on the nose gear axel 186. Nose gear mount 284 is attached to the rear face of the "A" bulkhead 220 and secures the nose gear to the airframe with a nose gear shaft 286.

The nose gear 180 may be fixed, may freely swivel, or may have positive control for steering. With reference to FIG. 2D, in forms of the invention where the nose gear has positive steering control, there is a nose gear servo mount plate 258 attached to the left sidewall 230 and right sidewall 232. The nose gear servo mount plate 258 holds a nose gear servo 266 with a nose gear servo control horn 267. A nose gear shaft control horn 268 is connected to the nose gear shaft 286 and coupled to the nose gear servo control horn 267 with a nose gear control rod 274 and control rod studs.

With reference to FIGS. 1C, 2B, and 2C, in forms of the invention with a main landing gear, the main landing gear may include a left main gear 190, a right main gear 192, a main gear spreader 194, a left main wheel 196, and a right main wheel 198. A left main gear forward mounting block 250, a left main gear aft mounting block 252, a right main gear forward mounting block 254, and a right main gear aft mounting block 256 may be used to attach the main gear to the airframe.

In various forms of the invention, the airframe and landing gear are constructed to allow for payload to be stored within the airframe and then dropped. The landing gear allows for the aircraft to land loaded without bending, while still providing enough clearance for the payload bay door to completely open and for payload to be released clear of the airframe while in flight. The landing gear also protects the payload bay from incursion with the runway if the payload bay is employed as a dive brake/landing spoiler, should the system make a steep descent to land.

With reference to FIG. 2D, various forms of the invention include a motor 294, a motor mount 280, a propeller 292, and a propeller nut 290. The motor 294 may be attached to the motor mount 280, the motor mount 280 may be attached to the "A" bulkhead 220, and the propeller nut 290 may secure the propeller on the motor 294. Various forms of the invention may also include a battery 298, an electronic speed control ("ESC") 296, and/or a flight controller 288.

II.B. Autogyro or Other Airframes.

In some forms of the invention, the aircraft includes an airframe which has an autorotating rotor providing at least part of the total lift. These forms of the invention optionally incorporate non-rotating lifting elements such as lifting body or wings. In other forms of the invention, other fixed-wing or non-fixed wing aircraft may be utilized (e.g., helicopter, multi-rotor, lighter-than air, etc.).

III. CARGO CASSETTE

III.A. Cargo Cassette Module.

With reference to FIGS. 3A-3F, in some forms of the invention, the payload or cargo is housed within the cargo cassette 300. The cargo cassette 300 may be placed into the payload bay interior to the aircraft. The payload or cargo is contained in the cargo cassette 300. The cargo cassette bottom wall 310 may form both the floor of the payload compartment and the lower surface of the outer mold line skin of the aircraft. The cargo cassette 300 may be constructed with a cargo cassette forward wall 302, a cargo cassette left wall 304, a cargo cassette right wall 306, a cargo cassette top wall 308, a cargo cassette bottom wall 310, and a cargo cassette control horn 312.

With reference to FIG. 2D, in some forms of the invention, the cargo cassette control horn 312 is coupled to the payload cassette servo 264 by way of a payload cassette control rod 276 and a payload cassette servo control arm 269.

III.B. Cargo Cassette Installation, Deployment, and Aerodynamics.

With reference to FIGS. 4A-4E, in various forms of the invention, the cargo cassette 300 may pivot to release payload, while at the same time deflecting the external airstream downwards to help keep the outer airflow from pushing the payload back into contact with the vehicle skin. In various forms of the invention, opening the payload cassette may have the aerodynamic effect of causing a nose-up pitching moment on the vehicle and increasing lift. This causes the vehicle to climb away from the drop point and helps accelerate the vehicle up and away from the payload. In various forms of the invention, the cargo cassette 300 may be employed as a dive brake or landing spoiler, should the system need (e.g., make a steep descent to land, etc.).

Figure 4A:
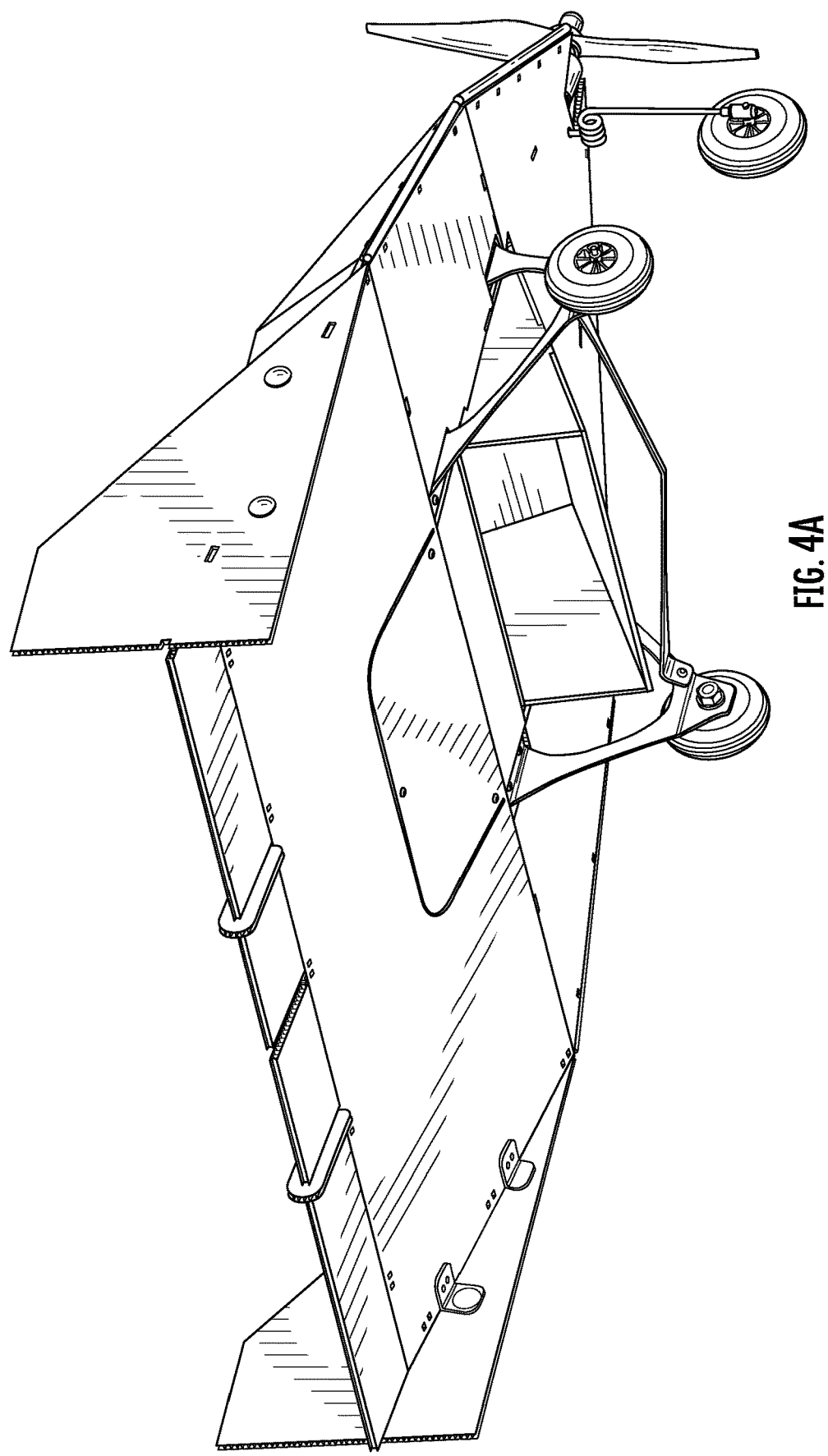
FIG. 4A depicts a bottom right isometric view of a lifting-body airframe that may be used by various forms of the invention with the payload cassette in an open position.
Figure 4B:
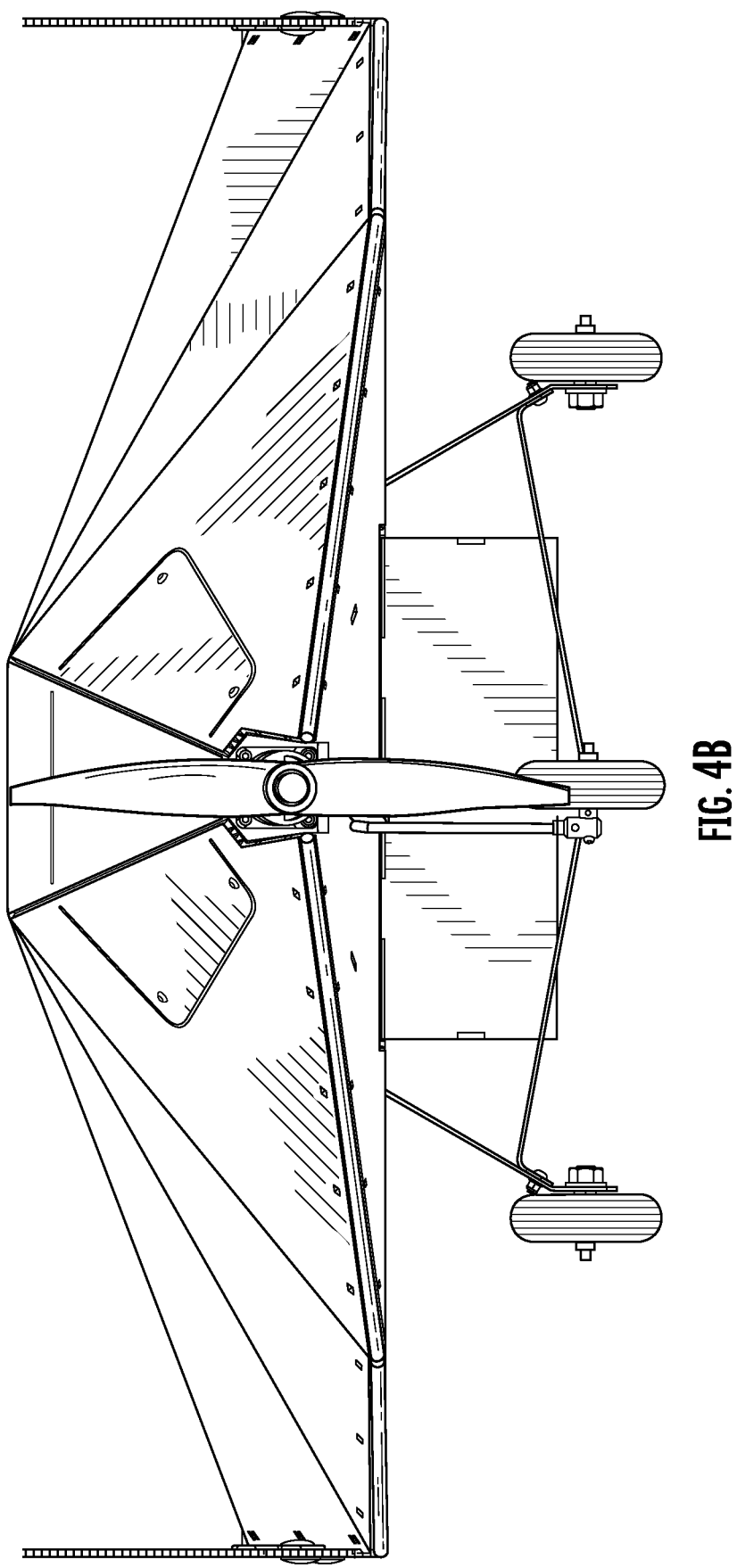
FIG. 4B depicts a front view of a lifting-body airframe that may be used by various forms of the invention with the payload cassette in an open position.
Figure 4C:
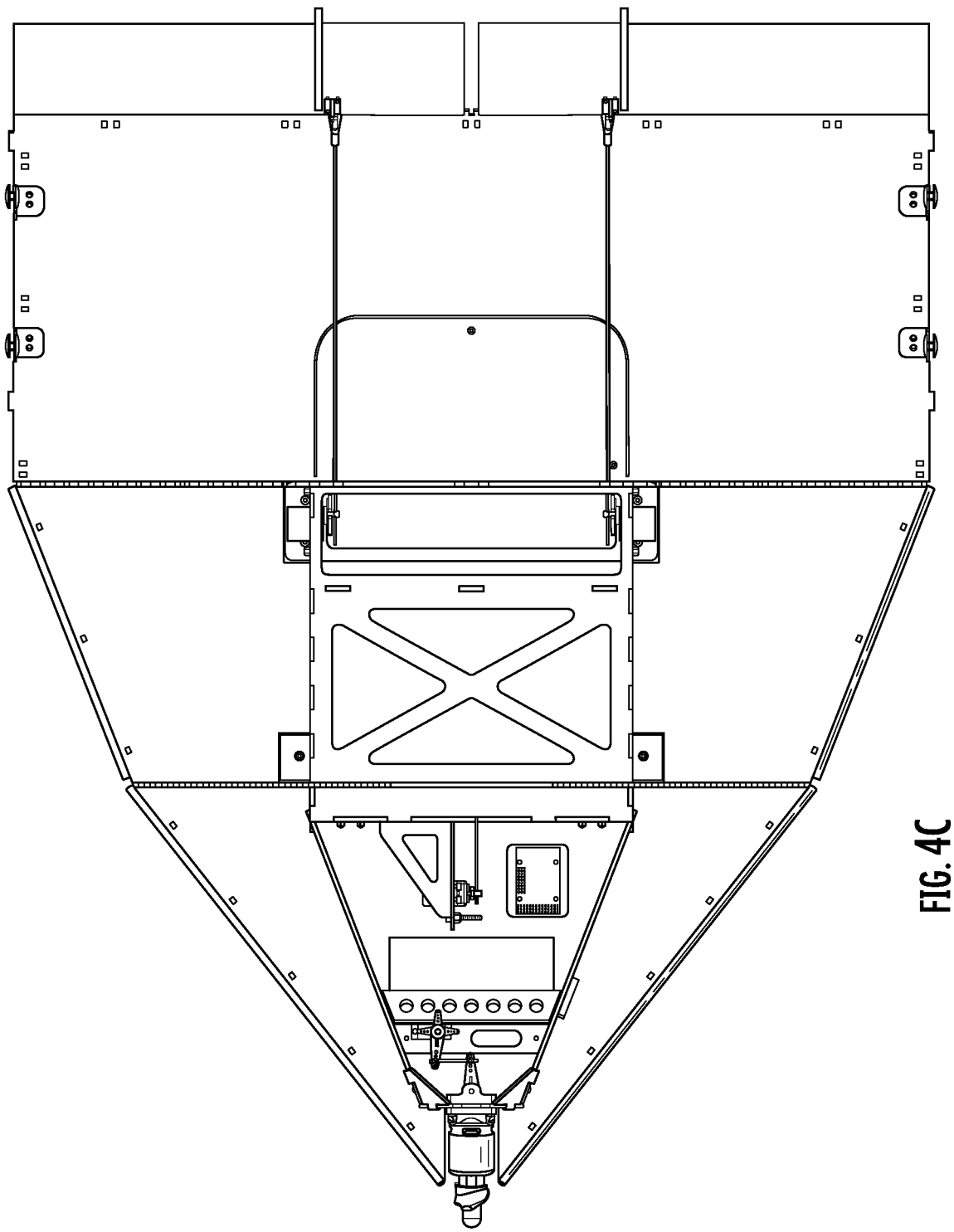
FIG. 4C depicts a top view of a lifting-body airframe that may be used by various forms of the invention with the top facet surfaces removed and with the payload cassette in an open position.
Figure 4D:
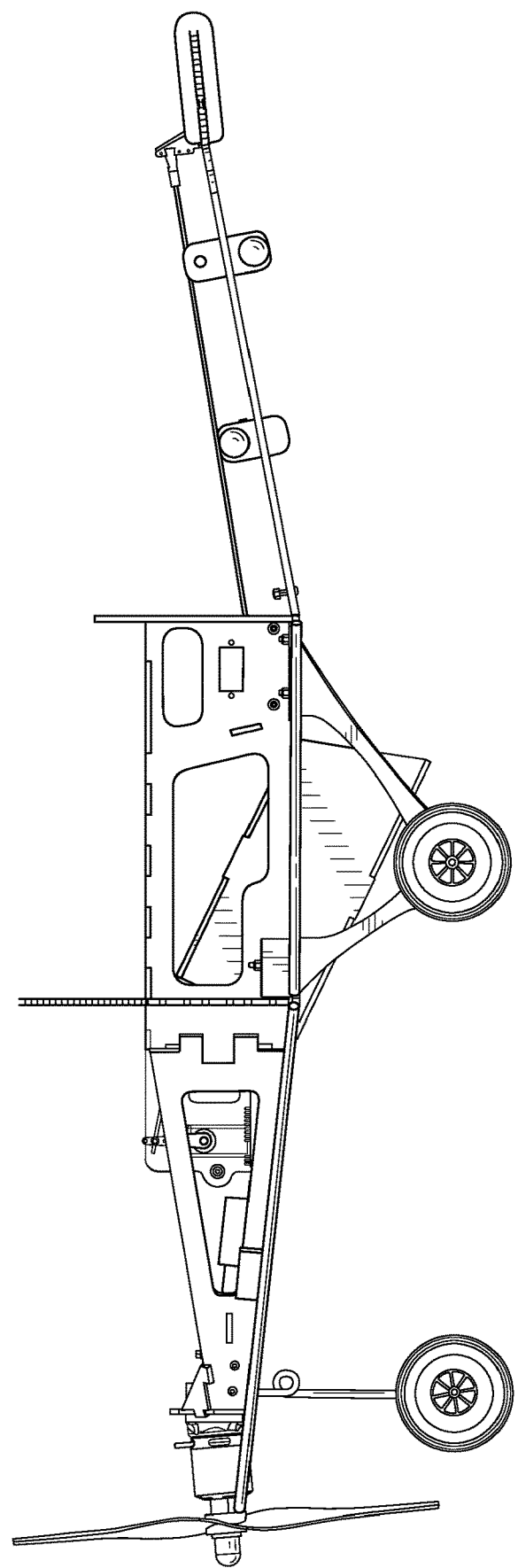
FIG. 4D depicts a left side view of a lifting-body airframe that may be used by various forms of the invention with the top facet surfaces removed and with the payload cassette in an open position.
Figure 4E:
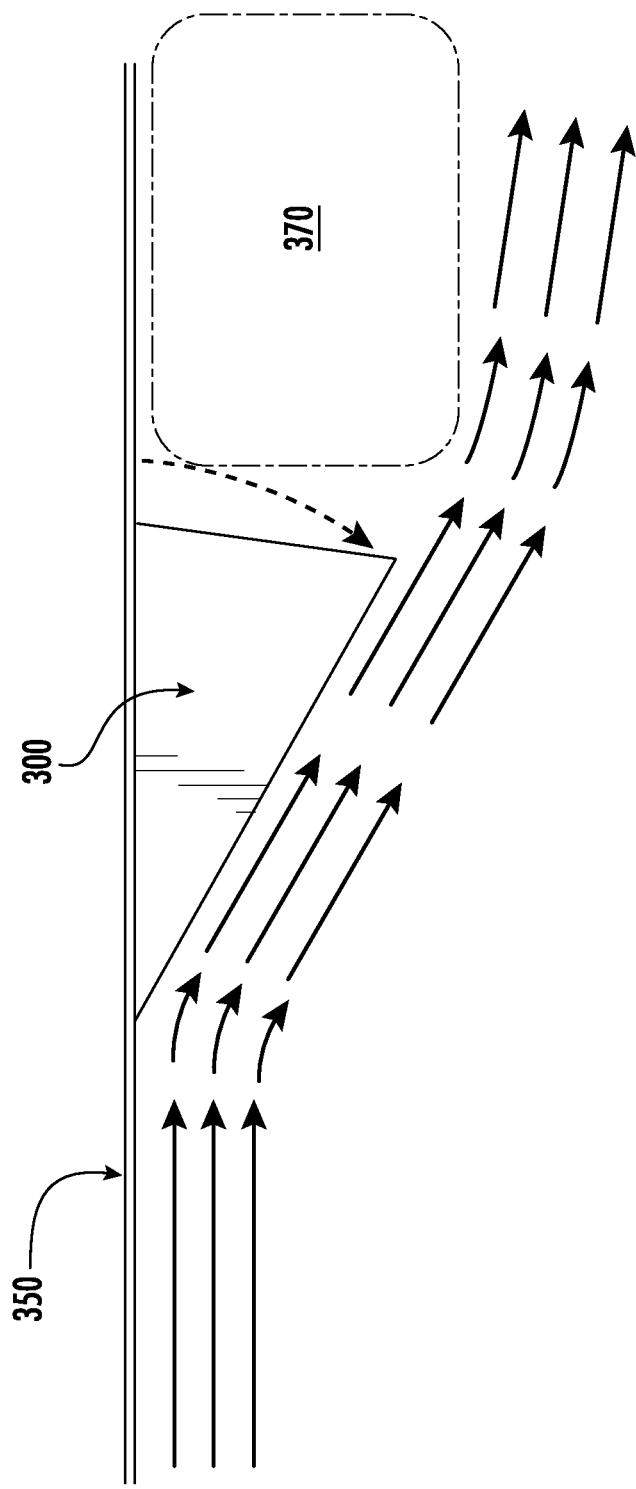
FIG. 4E depicts a left side view of the airflow around the payload cassette in an open position on the bottom of a lifting-body airframe that may be used by various forms of the invention.

With reference to FIG. 4E, a left side view of the airflow around the payload cassette 300 in an open position on the bottom of a lifting-body airframe that may be used by various forms of the invention is depicted. When the payload cassette 300 is open, outer air flow is deflected downwards relative to the bottom skin 350 of the vehicle. A calm air zone 370 is formed behind the open payload module. The payload drops into the calm air zone behind the open module, then falls cleanly away from the vehicle.

III.C. Alternate Cargo Cassette Forms.

In various forms of the invention, the cargo cassette 300 can take different forms to accommodate different types of payloads and achieve different mission objectives. For purposes of illustration and without limitation, the cargo cassette 300 may incorporate: different apertures and release mechanisms may be put to use including doors that pivot to the side (e.g., "bomb-bay" style doors, etc.); mechanisms to actively drive cargo out of the aircraft bay; mechanisms to meter or dose material or liquid as it is ejected from the aircraft; drag devices to encourage forward deceleration; and/or, additional "pre-drop" mechanisms (e.g., in the case of an 'aerial ignition' use case during firefighting, the aircraft may be employed to create fire breaks by dropping flammable material such as cellulose spheres (e.g. "ping pong balls", etc.) containing an activator that are injected with glycol at the point of release in order ignite at ground-level moments later). Accordingly, various types of cargo cassettes 300 may be employed in conjunction with the payload bay to adapt the aircraft to various use cases.

IV. PROPULSION AND CONTROL SYSTEM

With reference to FIG. 5, a diagram of the propulsion, control and electrical system 500 utilized with at least one form of the invention is shown. In various forms of the invention different sensors or combinations of sensors may be used. Sensor(s) 502 may be incorporated into the electrical system or be included in, or coupled to, a flight controller 504. Sensors may include any number of devices such as an accelerometer, GPS receiver, compass, barometer (e.g., a BMP280 I2C barometer, etc.), airspeed sensor (e.g., differential pressure sensor, etc.), angle of attack sensor (e.g., differential pressure sensor, etc.) attitude determination circuitry (e.g., an IMU such as an MOU6000, etc.), range sensors, or any other sensor, sensor type, or combination of sensors, camera (e.g., visible light, infrared, spherical, any other type of camera, etc.), or any other sensor.

In various forms of the invention, different types of flight controllers may be used. For example, the flight controller 504 may include or omit or otherwise be interfaced with any combination or number of: a microcontroller (e.g., 168 MHz STM32F405 MCU, etc.); motor outputs; servo outputs; a battery voltage sensor; a speaker or beeper for audio alerts, one or more light emitting diodes (LEDs) for indicating flight control, voltage or other status information; a LED strip module or interface for visual effects or visibility in flight (e.g., WS2812, etc.), a storage memory interface for retrieving or storing data such as a Micro SD card slot (SD/SDHC); video capture circuitry; video processing circuitry; video display circuitry; on screen display circuitry for annotating first-person view ("FPV") video (e.g., an INAV OSD with AT7456E chip, etc.); virtual COM port; universal asynchronous receiver and transmitter; pulse position modulation circuitry; serial bus inverter; and/or a received signal strength indicator (e.g., RSSI, etc.).

In various forms of the invention, the flight controller 504 may be coupled to aerodynamic flight control surfaces 506 by way of, for example, servo outputs to the flight control servos. Specifically, flight controller 504 may be electrically coupled to servos via servo outputs of the flight controller 504, and the servos are mechanically connected to aerodynamic flight control surfaces 506. The flight controller 504 may also be coupled to a cargo release mechanism 508.

In various forms of the invention, the flight controller 504 may also be coupled to a speed controller 510, the speed controller 510 may be connected to a motive power system 512, and the system also may include a source of electrical power such as a rechargeable battery 518.

In various forms of the invention, the flight controller 504 may also include, or be coupled to, a telemetry radio 514. Ground station 516 may be wirelessly coupled to telemetry radio 514.

In various forms of the invention, the motive power system 512 may include an electric power plant such as a DC brushless electric motor, the speed controller may be an electronic speed controller 510, and a lithium-polymer battery may provide power to the DC motor. For purposes of illustration, these forms of the invention may have a 10 nm-range with a 1 lb. payload, or more.

In other forms of the invention that utilize an internal combustion engine, the motive power system 512 may include an internal combustion engine or other type of fuel burning engine, the speed controller 510 may be an internal combustion engine controller (e.g., electronic engine controller (EEC), engine control unit (ECU), full authority digital engine control (FADEC), etc.). For purposes of illustration, these forms of the invention may have a 100 nm-range with 10 lb. payload.

V. AIRCRAFT GUIDANCE AND PRECISION DELIVERY OF CARGO

V.A. Generally.

In various forms of the invention, the vehicle may be autonomous. Alternatively, a remote human operator may control any phase of the flight including the final approach and/or delivery trajectory and/or payload drop using either direct line-of-sight or FPV imagery downlinked from the vehicle to a remote ground station.

V.A.1. Takeoff/Departure Procedure.

Figure 6A:
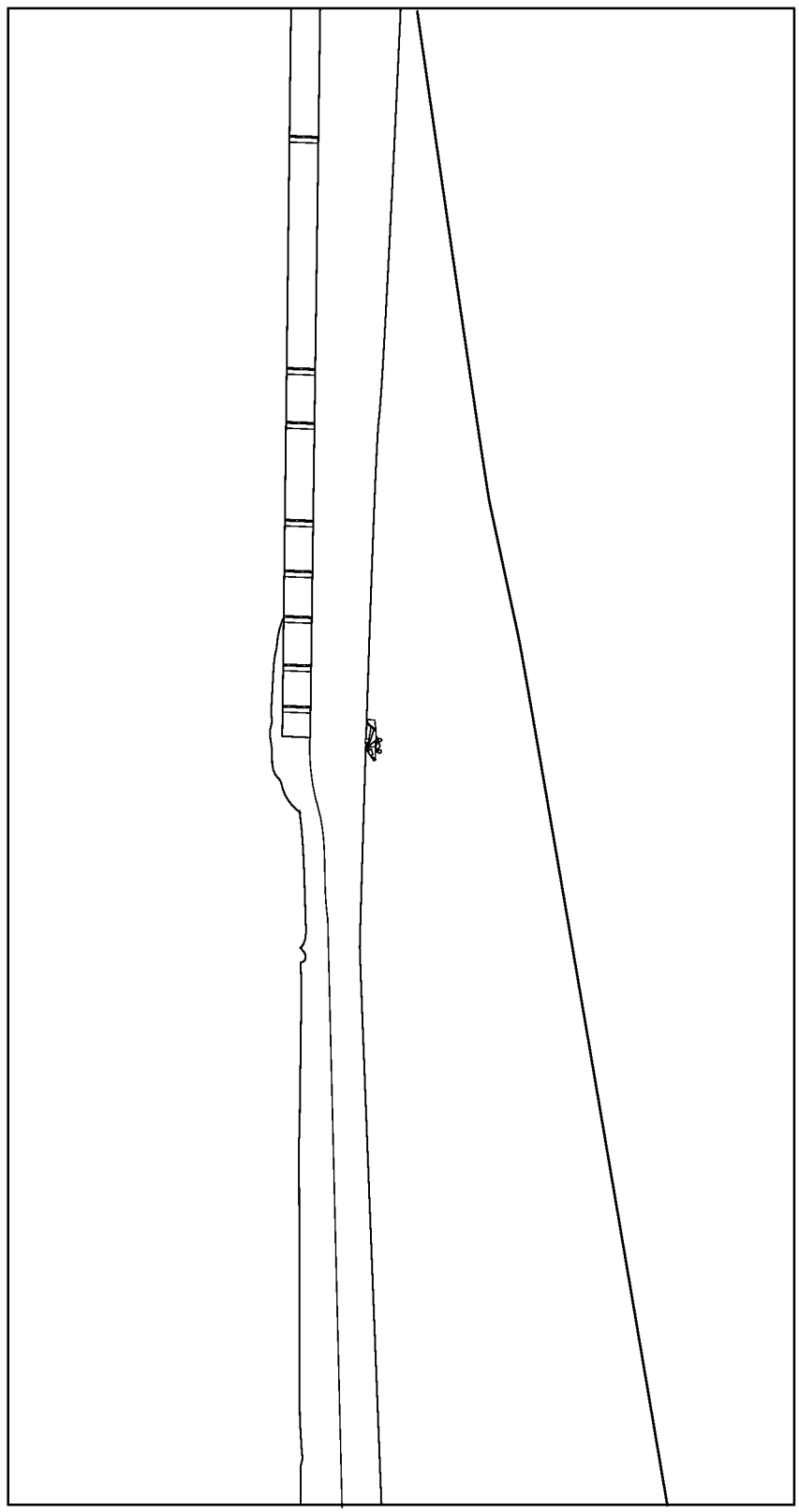
FIG. 6A depicts a lifting-body aircraft that may be used by various forms of the invention preparing to takeoff.
Figure 6B:
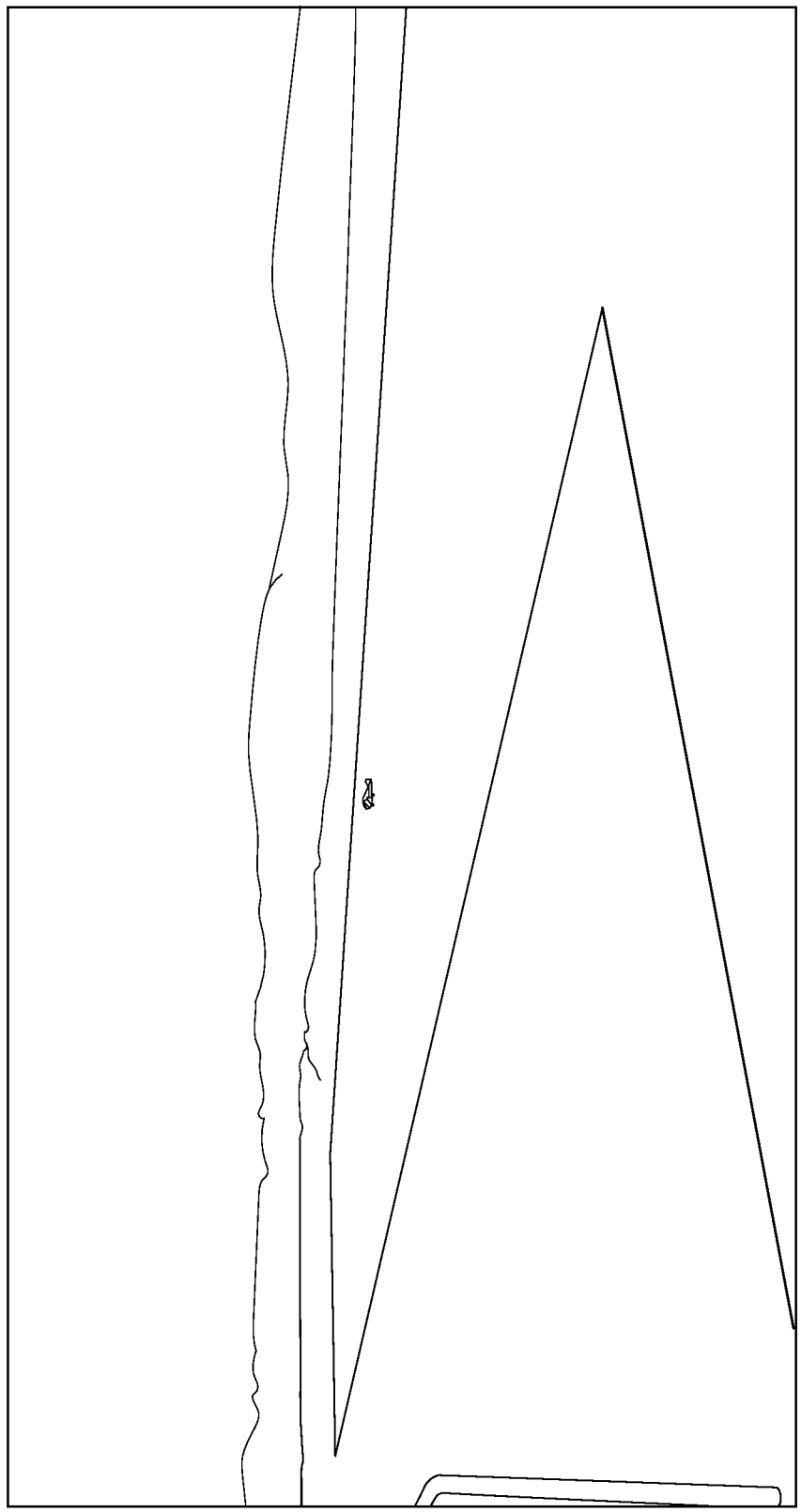
FIG. 6B depicts a lifting-body aircraft that may be used by various forms of the invention beginning its takeoff roll and rotating.

In various forms of the invention, the aircraft may be configured to take off and land at the same or a different airport for each flight; however, the aircraft may also take off and land at non-airport locations. For departure and landing areas, precision GPS information and planned departures may be loaded into the aircraft. With reference to FIG. 6A, in various forms of the invention, the aircraft is placed or maneuvers to a takeoff area or runway. With reference to FIG. 6B, in various forms of the invention, the aircraft begins its takeoff roll and when there is enough airspeed the elevons are actuated by the flight controller to begin the takeoff rotation. With reference to FIG. 6C, in various forms of the invention, the aircraft lifts off the ground and begins executing a departure procedure.

V.A.2. Cruise.

Figure 7:
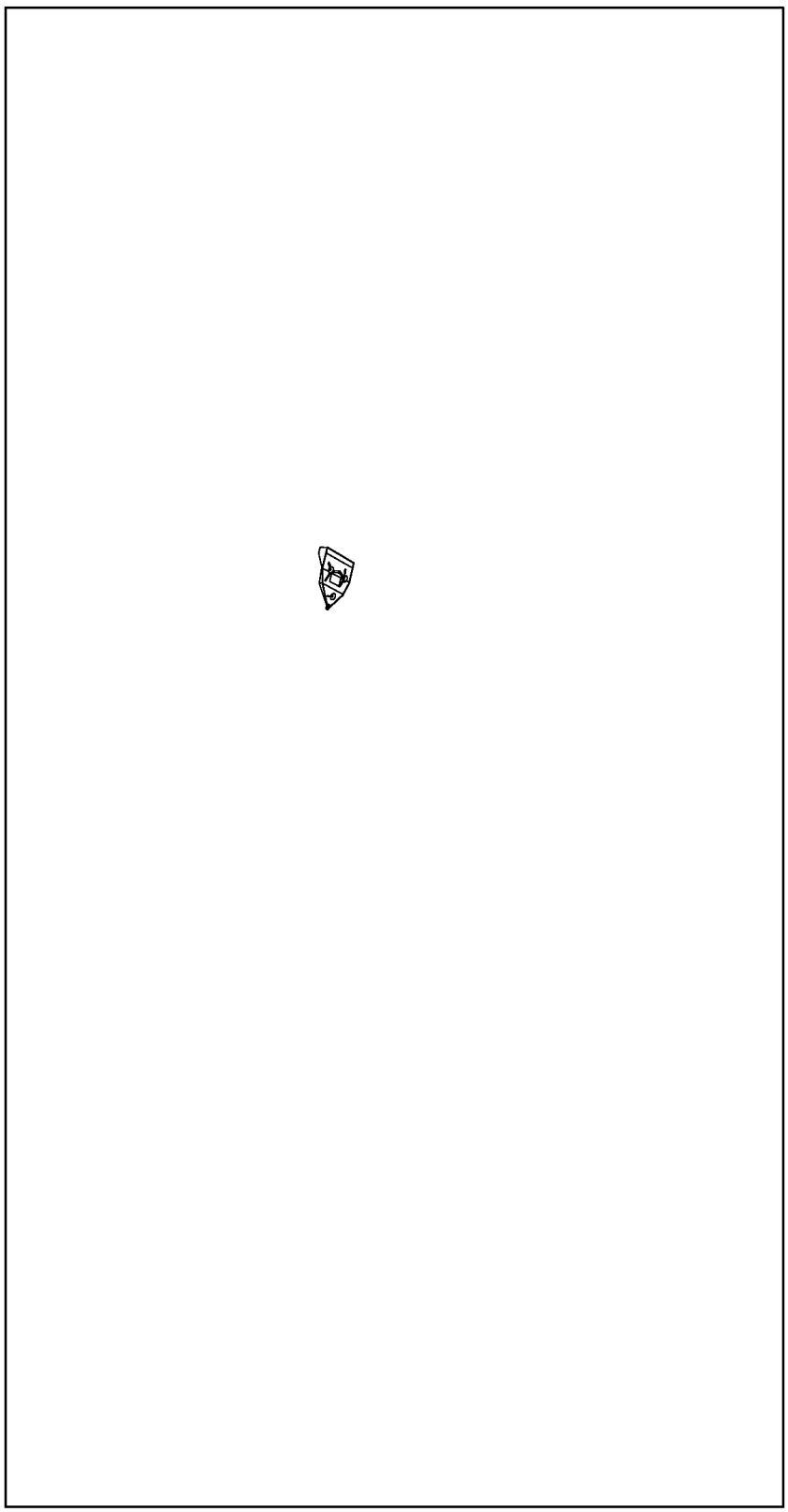
FIG. 7 depicts a lifting-body aircraft that may be used by various forms of the invention in cruising flight.

In various forms of the invention, and with reference to FIG. 7, en-route navigation may utilize GPS to fly along paths that are loaded into or communicated to the aircraft.

V.A.3.

Target/Delivery/Delivery Trajectory. In various forms of the invention cargo delivery areas may be airport or airport-like locations, or off-airport locations (e.g., a basketball court, a helipad, a clearing, a road, etc.). For delivery areas, precision GPS information and planned approaches are created and may be loaded into the aircraft. Precision GPS location information and routes relating to pre-planned departures, delivery trajectories, and approaches may be stored in the aircraft. In various forms of the invention, terminal guidance routines may determine when to drop the payload such that it lands at a specified GPS coordinate(s), and/or various forms of the invention employ a downward-looking camera and optical pattern recognition to drop the payload on a target designation marking or recognized landmark on the ground.

V.A.3.a. Low, Slow, High Angle of Attack Delivery Method.

Figure 8A:
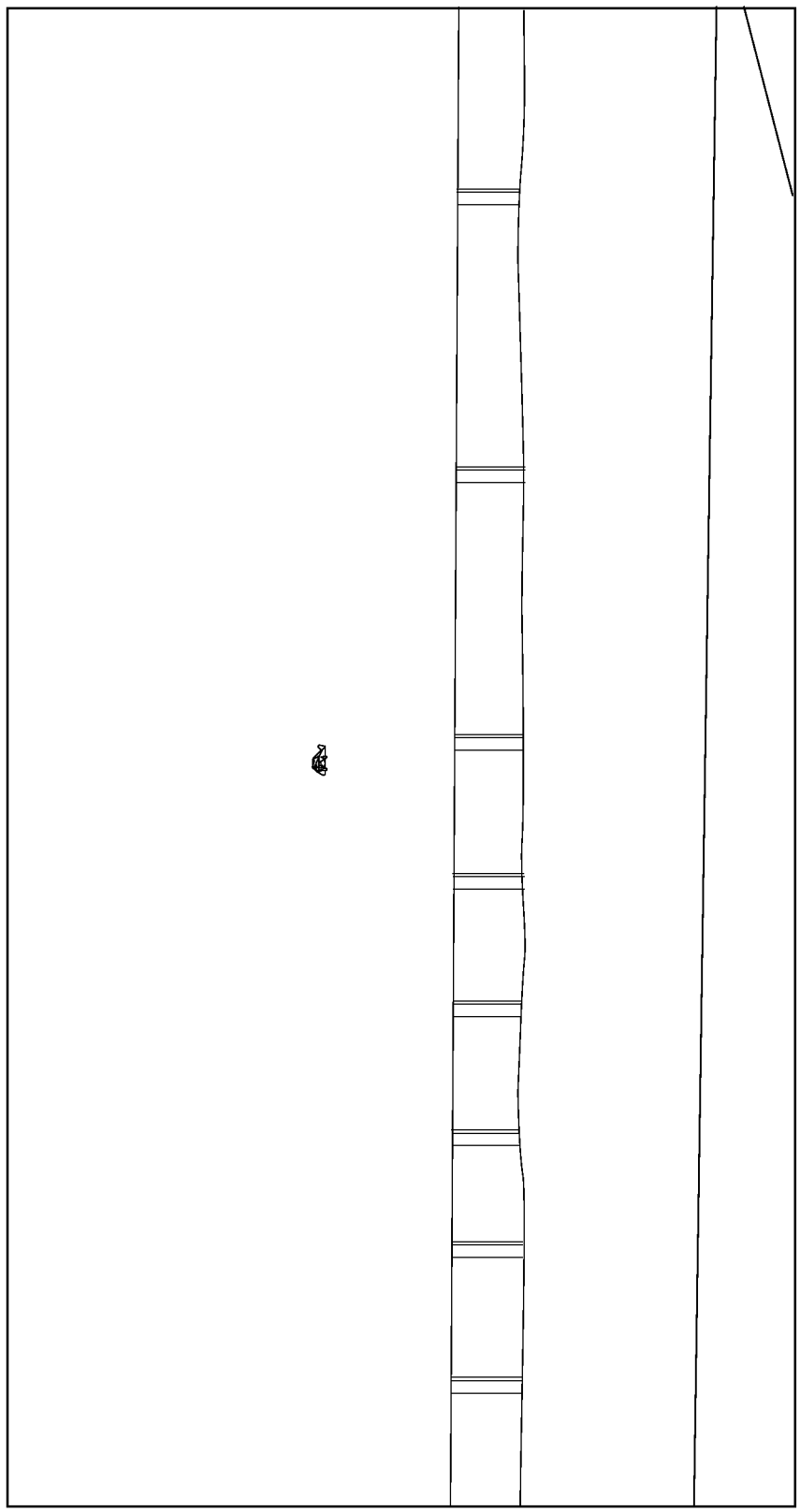
FIG. 8A depicts a lifting-body aircraft that may be used by various forms of the invention beginning to fly a delivery trajectory over a target delivery point for the payload.

With reference to FIG. 8A, a lifting-body aircraft that may be used by various forms of the invention beginning to fly a delivery trajectory over a target delivery point for the payload is depicted. For purposes of illustration, the vehicle flies a trajectory which includes flying very slowly at extremely low altitude to the target delivery point for the payload. In various forms of the invention, a drop approach may be parallel with the runway or drop/target area. In other forms of the invention, the drop approach may not be parallel with the runway or drop/target area. The vehicle trajectory is flown so that the vehicle is in level flight at very low altitude (e.g., less than 10 feet above ground level ("AGL") depending on various factors, etc.) as it passes over the target delivery point for the payload. As it approaches the drop point, the vehicle is commanded to fly at low airspeed and (in the case of the preferred lifting-body vehicle) high angle of attack (e.g., greater than or equal to: 15 degrees, 20 degrees, 25 degrees, 30 degrees, etc.). When the payload bay opens, the airplane may pitch up slightly.

Figure 8B:
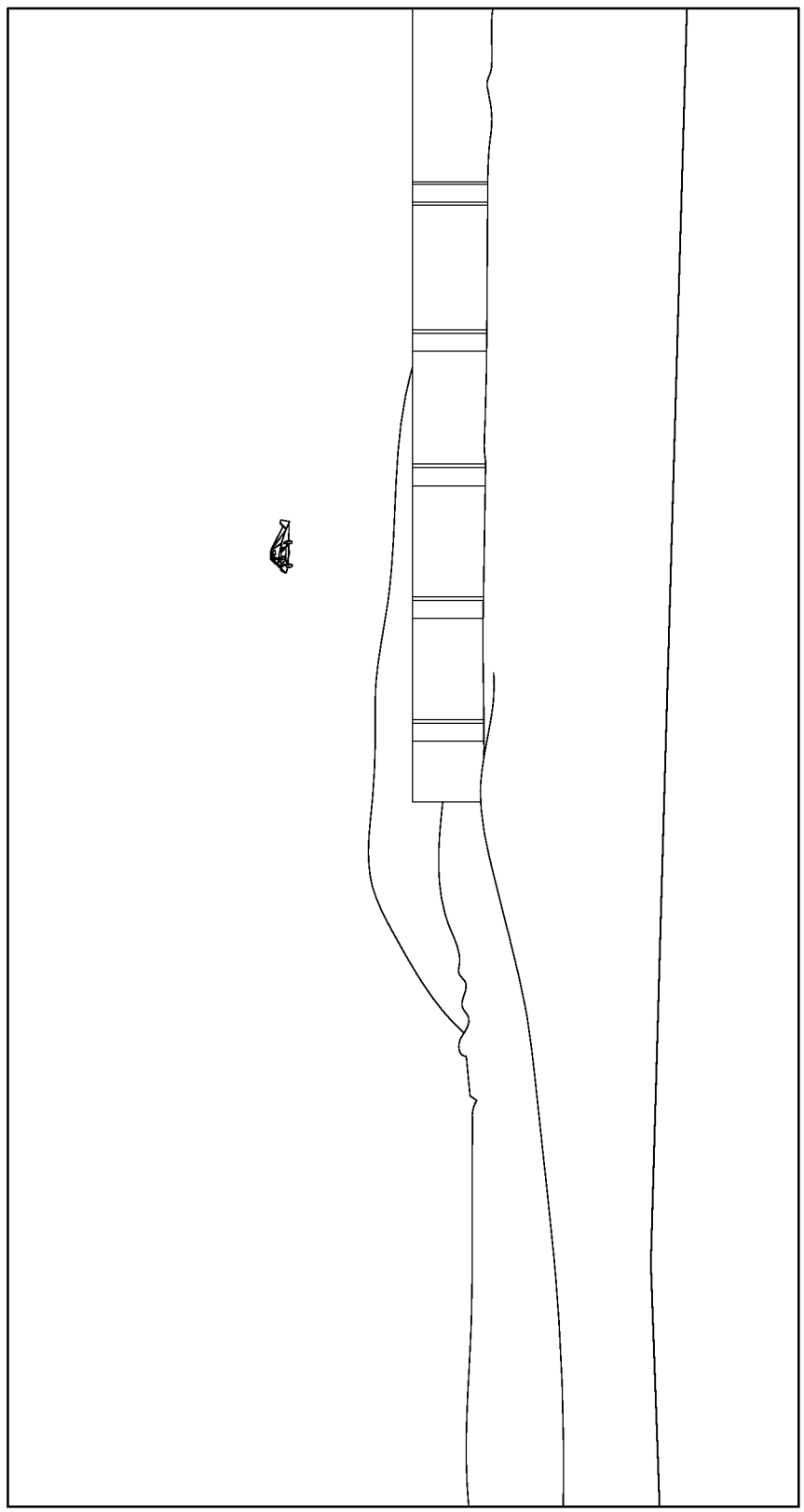
FIG. 8B depicts a lifting-body aircraft that may be used by various forms of the invention flying a delivery trajectory at low altitude and increasing its angle of attack to maintain lift while slowing its airspeed and groundspeed.

With reference to FIG. 8B, a lifting-body aircraft that may be used by various forms of the invention flying a delivery trajectory at low altitude and increasing its angle of attack to maintain lift while slowing its airspeed and groundspeed is depicted.

Figure 8C:
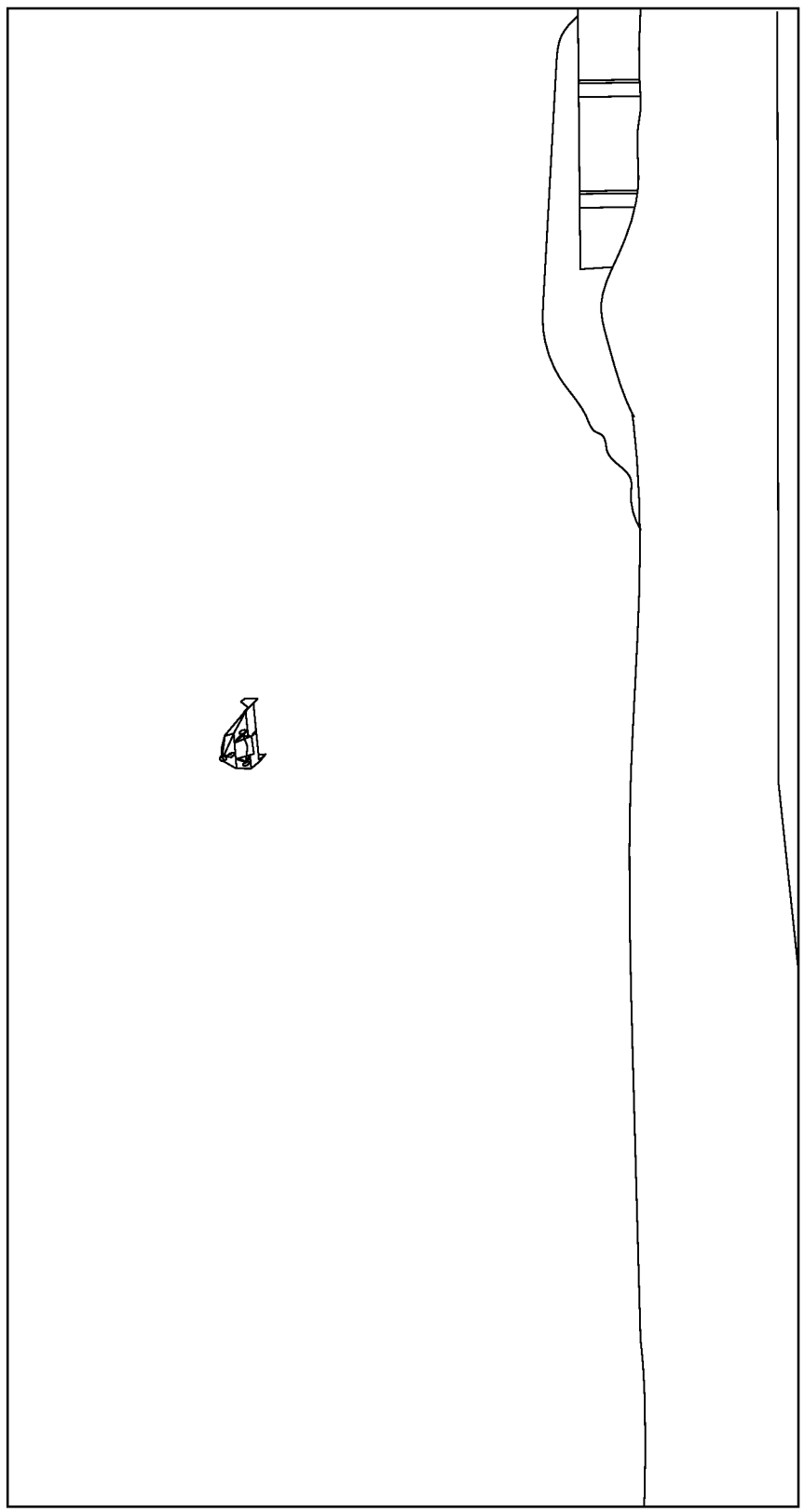
FIG. 8C depicts a lifting-body aircraft that may be used by various forms of the invention flying a delivery trajectory at low altitude and further increasing its angle of attack to maintain lift while slowing its airspeed and groundspeed, with the payload cassette open to initiate a nose-up rotation of the aircraft and release the payload.

With reference to FIG. 8C, a lifting-body aircraft that may be used by various forms of the invention flying a delivery trajectory at low altitude and further increasing its angle of attack to maintain lift while slowing its airspeed and groundspeed is depicted. The airspeed may be reduced from cruising speed to the slowest possible forward airspeed at high angle of attack and to fly an approach path similar to an approach to landing (but with a potentially higher angle of attack) thereby achieving a minimum altitude and minimum airspeed when arriving at the drop location delivery waypoint.

Figure 8D:
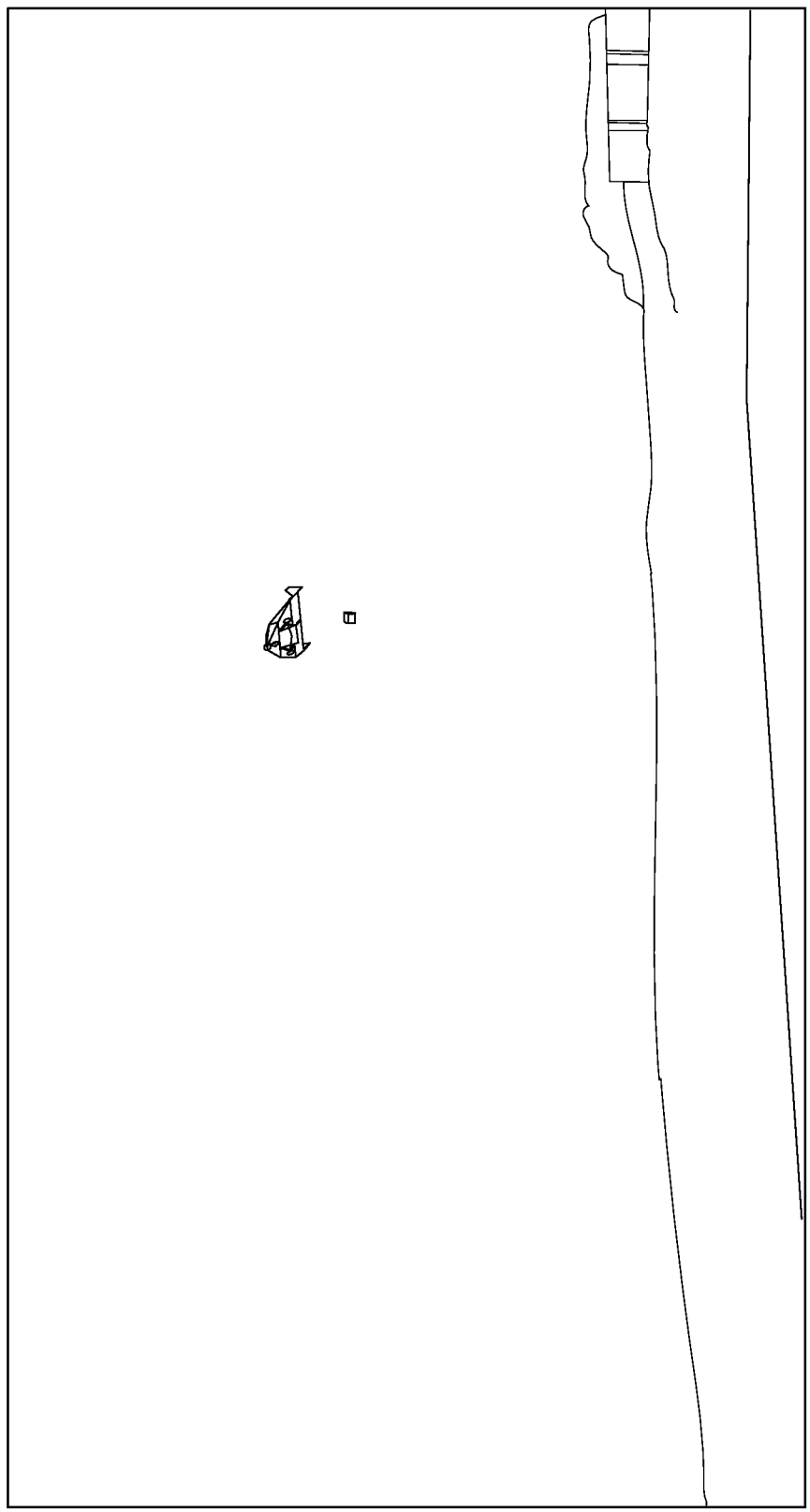
FIG. 8D depicts a lifting-body aircraft that may be used by various forms of the invention flying a delivery trajectory, approaching a target delivery point at low altitude, and causing the payload to be released such that it arrives at or very close to the target delivery point (or within a delivery area).

With reference to FIG. 8D, a lifting-body aircraft that may be used by various forms of the invention flying a delivery trajectory, approaching a target delivery point at low altitude, and causing the payload to be released such that it arrives at or very close to the target delivery point is depicted.

At the drop location delivery waypoint, the cargo cassette 300 is extended downward (e.g., as shown in FIGS. 4A-4E), which simultaneously releases the payload from the aircraft and serves as a passive aerodynamic device which causes the aircraft to steeply climb away from the released payload. The aircraft may then recover airspeed and resume cruising flight to land at the origin.

The payload is released from this low altitude and at a low speed, allowing the payload to impact the surface at relatively low total speed, which will allow the payload to be delivered to the ground intact without using parachutes or other aerodynamic decelerators. However, parachutes or aerodynamic decelerators may be used as required (e.g., depending on the specific circumstances of each mission or characteristics of the payload).

The low altitude and airspeed at payload release will minimize the dispersion of payload delivery and enable the payload to be delivered precisely without requiring the vehicle to land or hover.

In some forms of the invention, the payload is delivered within a specified threshold (e.g., within approximately 50 feet) of the aim point. In other forms of the invention, the payload may be delivered with greater or less precision (e.g., within inches of a specified point or less, within 30 ft, within 100 ft, etc.).

Figure 8E:
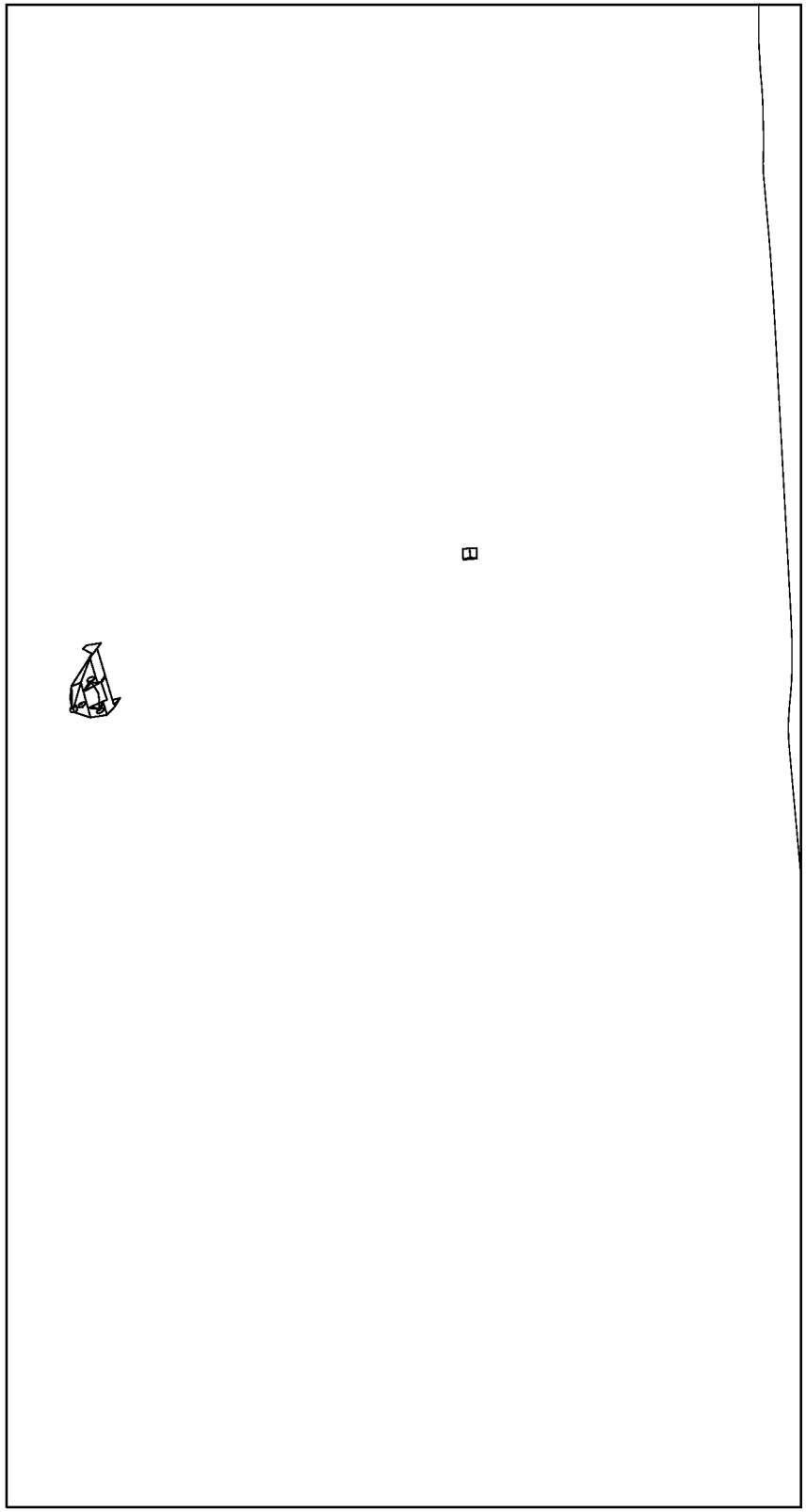
FIG. 8E depicts a lifting-body aircraft that may be used by various forms of the invention flying a delivery trajectory after causing the payload to be released.

With reference to FIG. 8E, a lifting-body aircraft that may be used by various forms of the invention flying a delivery trajectory after causing the payload to be released is depicted.

Figure 8F:
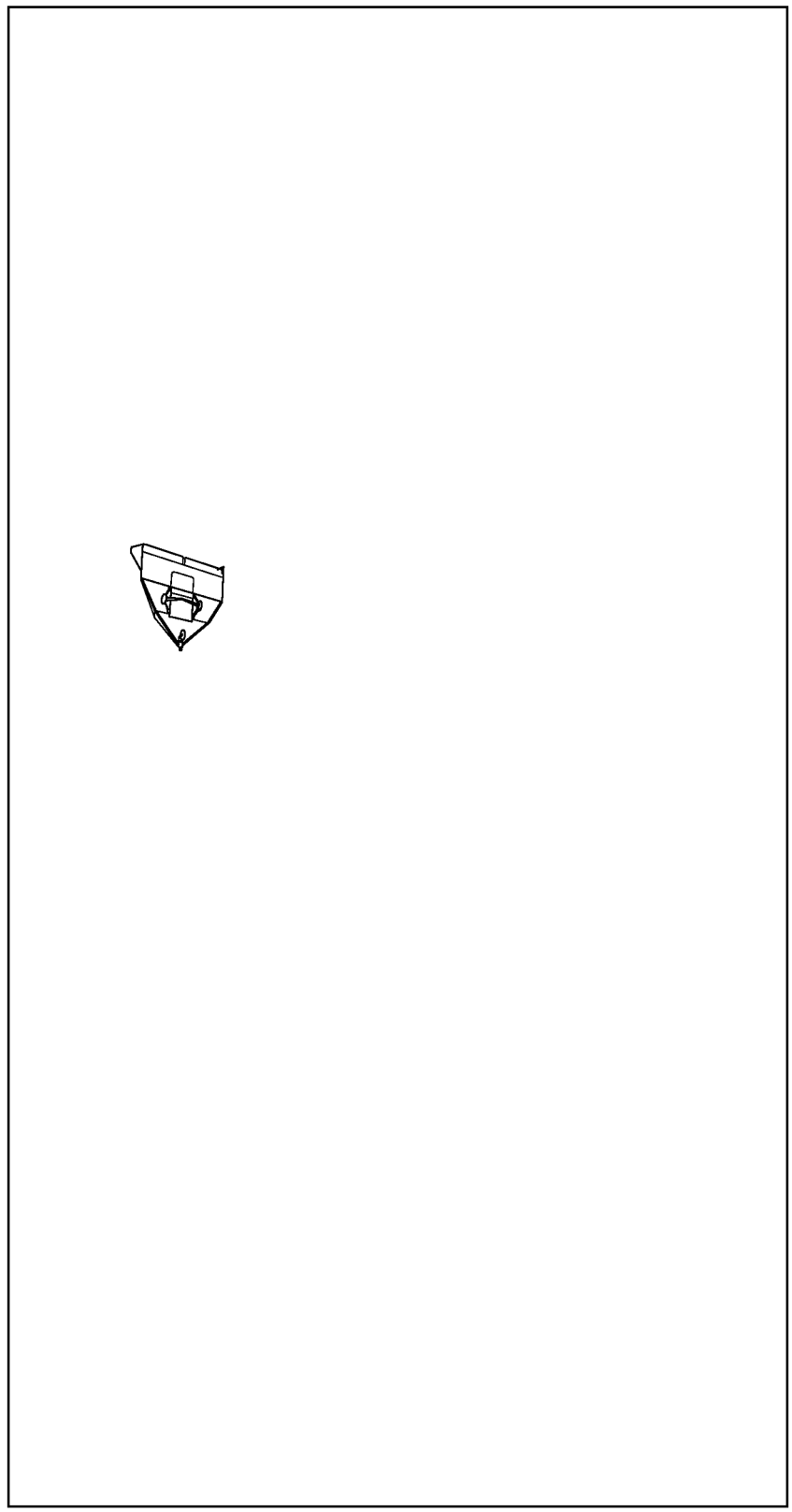
FIG. 8F depicts a lifting-body aircraft that may be used by various forms of the invention finishing a delivery trajectory with by reducing the angle of attack and increasing airspeed.

With reference to FIG. 8F, a lifting-body aircraft that may be used by various forms of the invention finishing a delivery trajectory with by reducing the angle of attack and increasing airspeed is depicted.

Figure 8G:
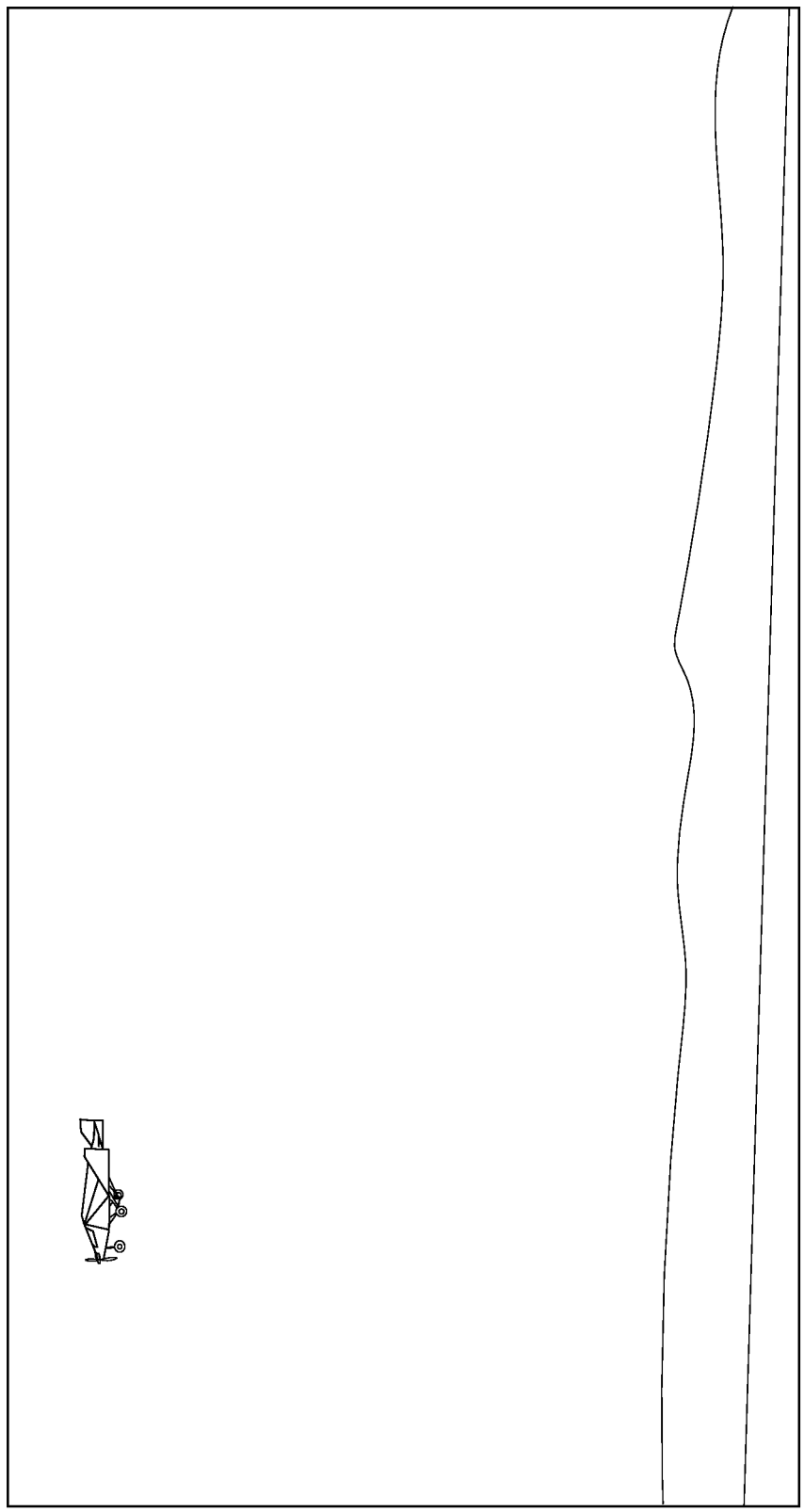
FIG. 8G depicts a lifting-body aircraft that may be used by various forms of the invention finishing a delivery trajectory with a reduced angle of attack.

With reference to FIG. 8G, a lifting-body aircraft that may be used by various forms of the invention finishing a delivery trajectory with a reduced angle of attack is depicted. The aircraft may then resume cruise flight to efficiently travel to the next delivery or destination.

V.A.3.b. Other Delivery Methods.

In various forms of the invention, cargo may be released on a tow line and the aircraft may be instructed to fly a circle with an appropriate bank 575 angle thereby causing the cargo to dangle below the aircraft. The aircraft is instructed to maintain forward speed while circling as the cable acquires a substantially converging helical form.

In various forms of the invention, the aircraft may incorporate a gyrocopter-like lifting device(s) to facilitate a vertical landing, or a slow rate of descent with no forward speed, to increase drop precision.

V.A.4. Approach to Landing/Landing.

In various forms of the invention, the aircraft may be configured to take off and land at the same or a different airport for each flight; however, the aircraft may also take off and land at non-airport locations. For departure and landing areas, precision GPS information and planned departures may be loaded into the aircraft.

Figure 9A:
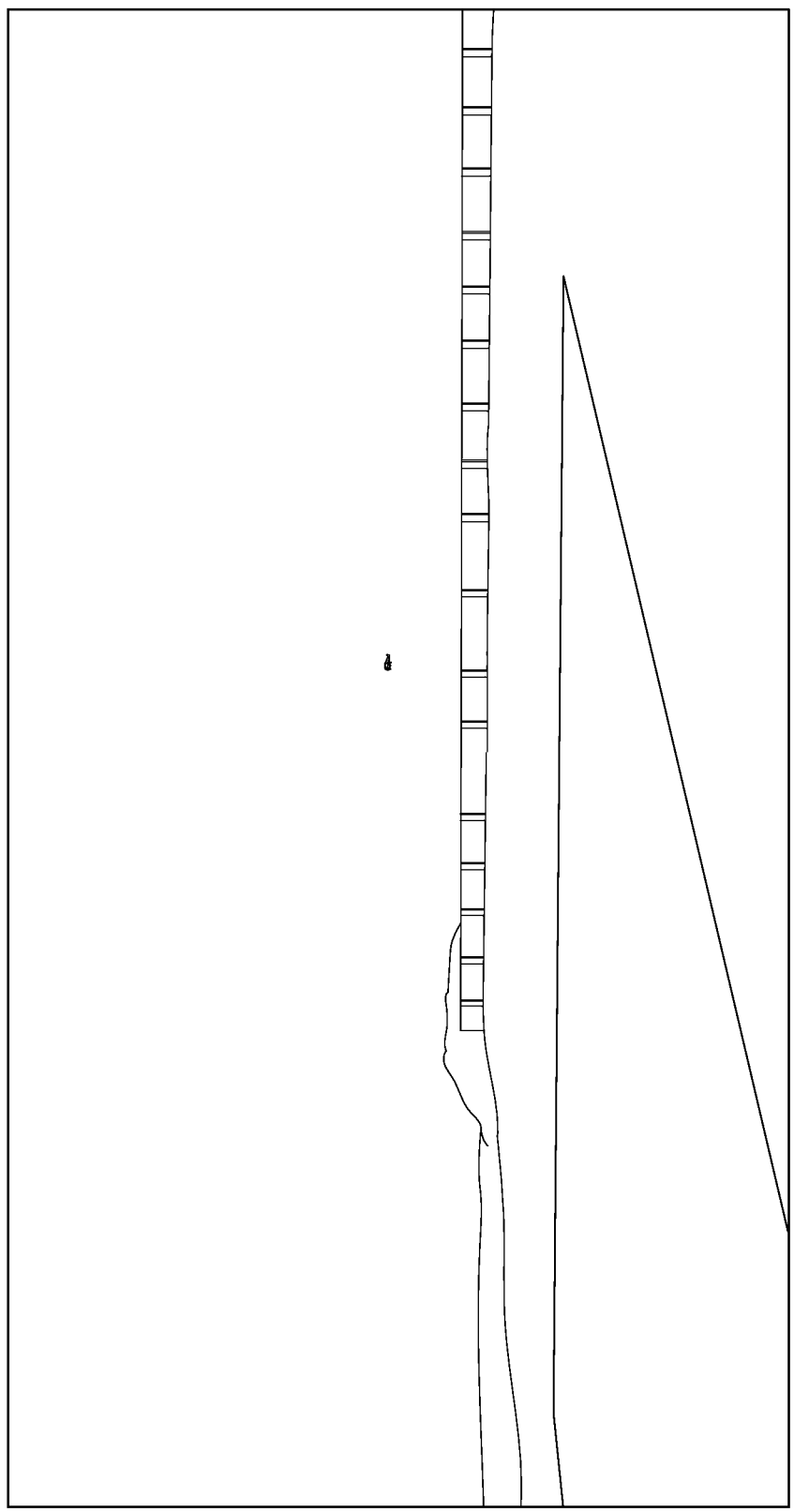
FIG. 9A depicts a lifting-body aircraft that may be used by various forms of the invention on final approach to landing.
Figure 9B:
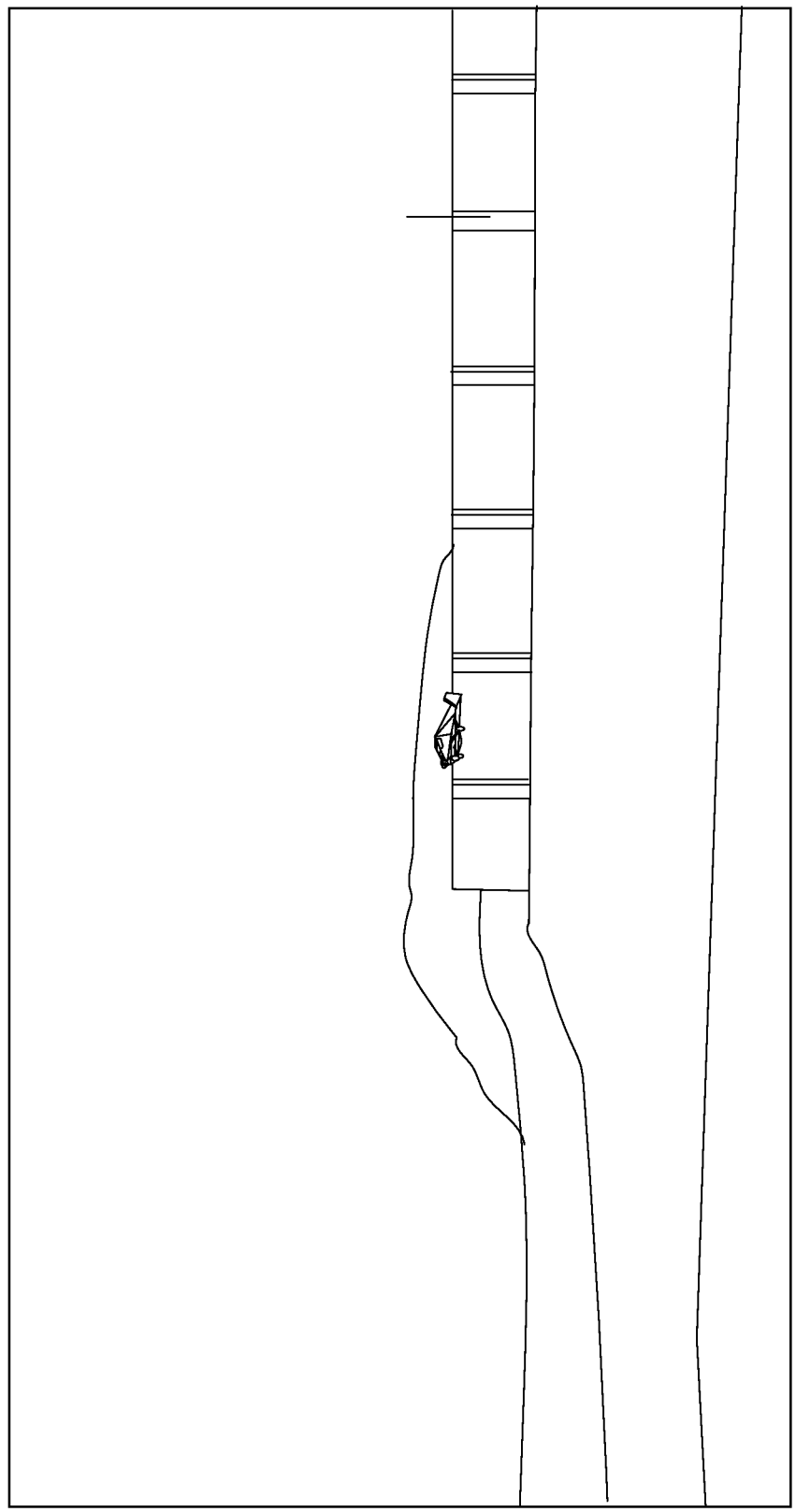
FIG. 9B depicts a lifting-body aircraft that may be used by various forms of the invention on short final approach to landing.
Figure 9C:
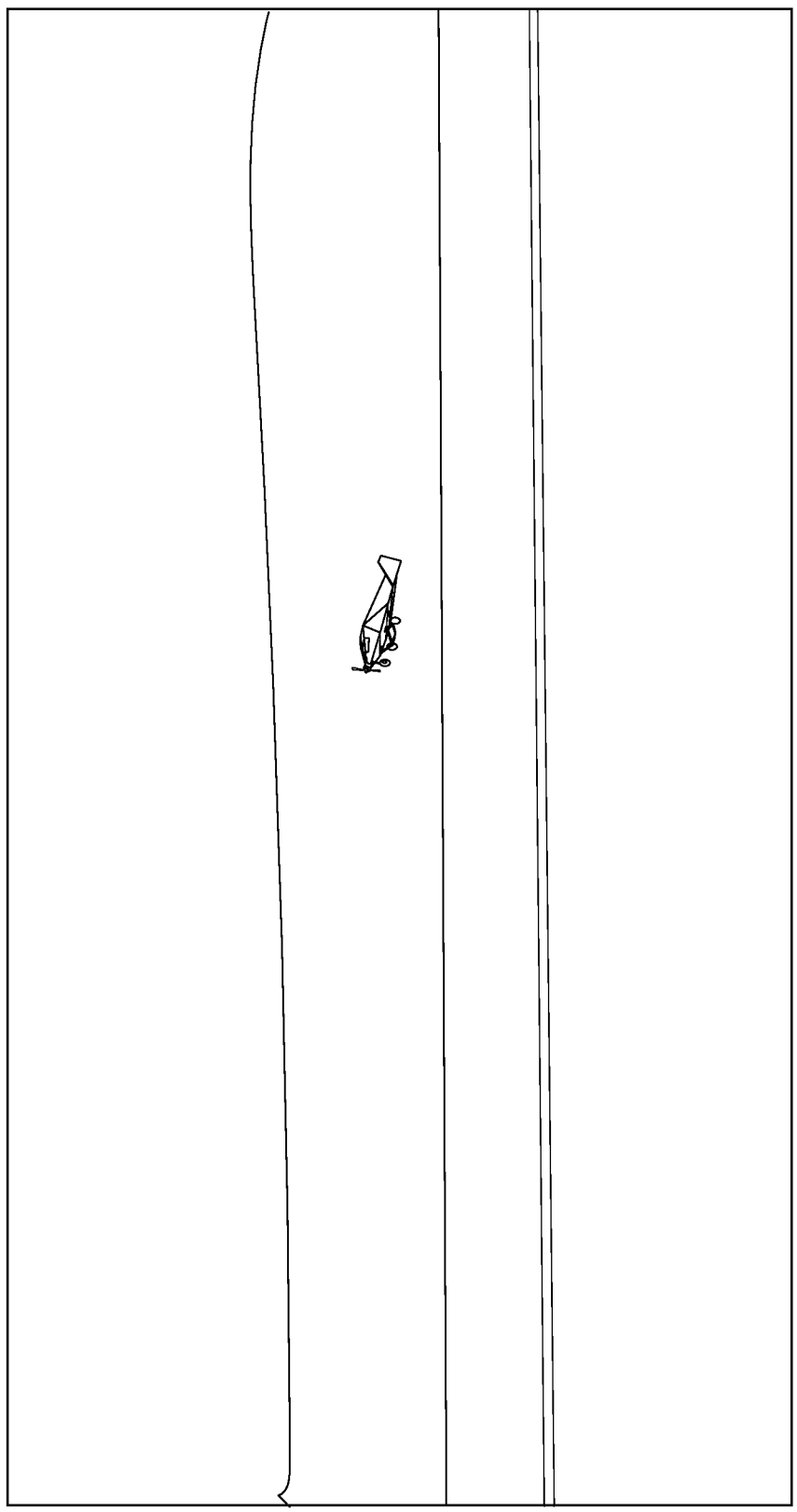
FIG. 9C depicts a lifting-body aircraft that may be used by various forms of the invention flaring to land.
Figure 9D:
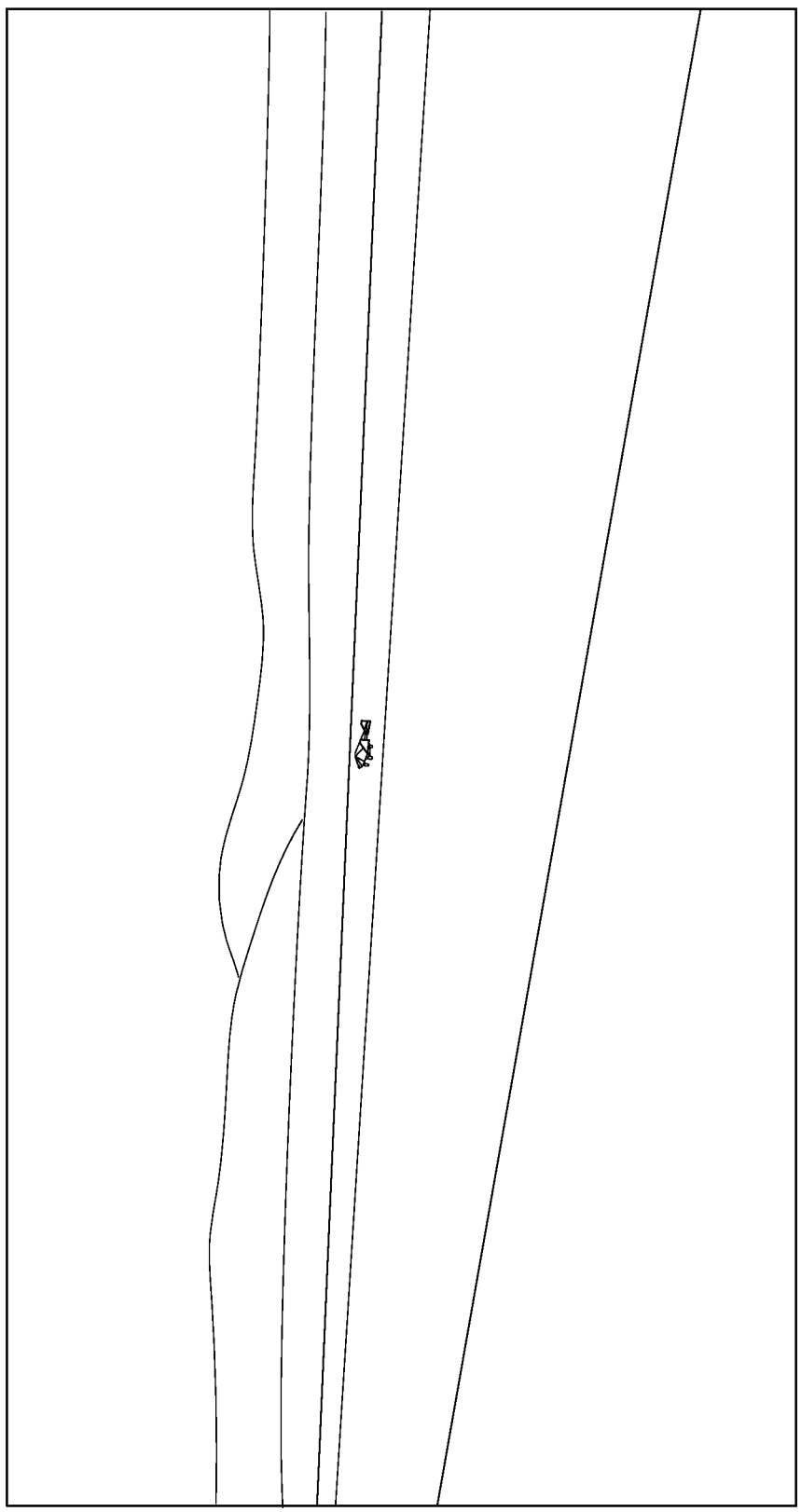
FIG. 9D depicts a lifting-body aircraft that may be used by various forms of the invention landing.

With reference to FIG. 9A, a lifting-body aircraft that may be used by various forms of the invention on final approach to landing is depicted. With reference to FIG. 9B, a lifting-body aircraft that may be used by various forms of the invention on short final approach to landing is depicted. With reference to FIG. 9C, a lifting-body aircraft that may be used by various forms of the invention flaring to land is depicted. With reference to FIG. 9D, a lifting-body aircraft that may be used by various forms of the invention landing is depicted. As discussed above, the cargo cassette 300 may be deployed during landing as a drag device to increase lift and/or descent rate.

VI. EXEMPLARY APPLICATIONS

Various use-cases include: (a) Parcel & Express Cargo, (b) Supply Chain Security, (c) Wildland Fire Suppression, (d) Search and Rescue, (e) Emergency Response Equipment Forwarding, (f) Crop Spraying and Seeding, and (g) Other Missions.

VI.A. Package & Express Cargo Delivery Mission.

VI.A.1. Pre-Flight.

Vehicle is prepared for flight: Systems checked, batteries charged, (fueled in forms of the invention using an internal combustion engine (ICE) as a propulsion unit).

VI.A.2. Cargo Loading.

Cargo (in package with packing material like bubble wrap, etc.) is loaded into payload bay and payload bay is closed. In various forms of the invention, the package may be a standardized box compatible with payload bay dimensions that will slide easily on payload bay floor for drop.

VI.A.3. Launch Preparation.

Vehicle is moved to launch point for takeoff.

VI.A.4. Takeoff.

In various forms of the invention, a conventional runway (or other surface) may be used takeoff. In forms of the invention utilizing a fixed-wing or lifting body airframe, takeoff can also be a catapult launch, or a release from a fixture on a ground vehicle that drives on a road and accelerates to launch speed before releasing the vehicle. In forms of the invention utilizing an autogyro aircraft, takeoff may be either a running take off on a runway, or a jump takeoff accomplished by over speeding the rotor on the ground and then using the combination of collective pitch and the stored kinetic energy of the rotor to jump into the air.

VI.A.5. Cruise.

In various forms of the invention, the vehicle will fly autonomously to an initial point near the target payload drop point. In other forms of the invention, the vehicle may utilize other flight control methods or a combination of flight control methods while en route.

VI.A.6. Payload Delivery.

In various forms of the invention, the vehicle will decelerate to lower-than-cruise airspeed and descend to low altitude, reaching minimum speed and altitude in close proximity to the target. Alternatively, the vehicle can fly a descending spiral path to avoid obstacles on approach to the target or fly a low-speed circle above the target and deliver the payload by having the payload suspended below the vehicle on a cable. By descending slowly with the payload suspended below the payload, which is nearly stationary at the centroid of the circling path of the vehicle can be lowered to the ground at very low speed.

VI.A.7. Payload Drop.

In various forms of the invention, at an appropriate time and location, the payload bay opens, and the payload is dropped at low speed onto the target point.

VI.A.8. Cruise-back.

In various forms of the invention, after dropping the payload, the vehicle climbs away from the drop point, accelerates to cruise speed and flies autonomously to the recovery point. In some forms of the invention, the recovery point is the same location as the launch point. In other forms of the invention, the recovery point is different from the launch point.

VI.A.9. Approach and Landing.

In various forms of the invention, the vehicle approaches and lands autonomously. Alternatively, in those or other forms of the invention, a human operator may take control and land the vehicle using line-of-sight or first-person view ("FPV") cueing.

VII.B. Supply Chain Security Mission.

In various forms of the invention, an aircraft may be employed for a supply chain security mission. In these missions, there is a need to transport high-value-density items as a component of a secure freight network. As such, it is advantageous to employ an aircraft as a method of protection from transportation hazard. In various forms of the invention, an aircraft would be able to land at a 635 clear site, on a flat platform affixed to a vehicle (such as a truck), or may lower a cable line with a basket, in order to receive goods, and then fly elsewhere to the secure receiving site in order to deliver said goods using one or more delivery methods listed above.

VI.C. Fire Suppression Mission.

In various forms of the invention, an aircraft may be employed for a fire suppression mission. In these forms of the invention, the aircraft is adapted to release water, fire retardant, or ignition-related materials from its payload bay and/or cargo cassette 300. In these forms of the invention used for ignition or seeding (discussed further below), the cargo cassette 300 is modified to include a hopper or other method of releasing in a measured fashion in order to set a linear or area coverage rate.

VI.D. Search & Rescue Equipment Forwarding Mission:

In various forms of the invention, an aircraft may be employed for a search and rescue or equipment forwarding mission. In these forms of the invention, necessities and equipment or gear related to rescue (e.g., rations, water, AEDs, rescue litters, heaters, inflatable tents, first aid/medical supplies, pharmaceuticals, fire extinguishers, other equipment in support of emergency response operators, etc.) is transported to a location near to an emergency response site or disaster area. The recipients of the items may be emergency responders or members of the general public in distress.

VI.E. Crop Spraying & Seeding Mission.

In various forms of the invention, an aircraft may be employed for a crop spraying and/or seeding mission. In forms of the invention that are adapted for crop spraying missions, the aircraft is adapted include a spray rig and the payload bay or cargo cassette 300 is adapted to include a tank and inlet for filling by liquid. The inlet for filling the tank is preferably on the top of the aircraft but may also be located on any surface of the aircraft including the bottom. In forms of the invention that are adapted for seeding missions, the cargo cassette 300 is modified to include a hopper or other method of releasing in a measured fashion in order to set a linear or area coverage rate.

VI.D. Other Missions.

In various forms of the invention, the aircraft may be modified to include any form of payload storage and release mechanism discussed herein, any permutation or combination of payload storage and release mechanisms discussed herein, or any other payload storage and release MECHANISM.

VII. CONCLUSION

As those skilled in the art will appreciate, many aspects of the invention, and the various forms of the invention, can beneficially be practiced alone and need not be coupled together. Unless specifically stated otherwise, no aspect of the invention should be construed as requiring combination with another aspect of the invention in practice. However, those skilled in the art will also appreciate that the aspects and various forms of the invention may be combined in any way imaginable to yield one of the various forms of this invention.

The invention claimed is:

1. A high transport efficiency aircraft apparatus for precisely delivering a payload at a target area without stopping, comprising:
   an aircraft adapted to fly less than 10 feet above ground level over the target area, with a delivery trajectory including a steep descent toward the target area and a steep ascent away from the target area;
   a payload bay constructed to contain the payload within the aircraft;
   a payload release mechanism adapted to release the payload from the payload bay when the aircraft flies over the target area, allowing the payload to fall and arrive unharmed at the target area unaided by an aerodynamic deceleration device; and
   a payload cassette disposed within the payload bay and containing the payload, the payload cassette further comprising a bottom wall that is contiguous with a portion of a bottom surface of an airframe of the aircraft.

2. The apparatus of claim 1, wherein the aircraft has a transport efficiency of at least 3.5 units of useful load per unit drag.

3. The apparatus of claim 1, wherein the aircraft is configured to fly the delivery trajectory at an angle of attack at or in excess of 15 degrees.

4. The apparatus of claim 1, wherein the aircraft is configured to fly the delivery trajectory at an angle of attack at or in excess of 30 degrees.

5. The apparatus of claim 1, further comprising a low aspect ratio lifting body airframe.

6. The apparatus of claim 5, wherein the airframe comprises a faceted top surface and a faceted bottom surface.

7. The apparatus of claim 1, wherein the payload cassette pivots open, rotating the bottom wall downward to deflect an external airstream, and wherein the payload release mechanism releases the payload into an aft calm air zone.

8. The apparatus of claim 7, wherein the opening of the payload cassette aerodynamically initiates a nose-up portion of the trajectory, increasing lift.

9. A high transport efficiency aircraft apparatus for precisely delivering a payload at a target area without stopping, comprising:
   a low aspect ratio lifting body airframe having a transport efficiency of at least 3.5 units of useful load per unit drag, and adapted to fly over the target area less than 10 feet above ground level, at an angle of attack at or in excess of 15 degrees, with a delivery trajectory including a steep descent toward the target area and a steep ascent away from the target area, wherein the airframe comprises a faceted top surface and a faceted bottom surface;
   a payload cassette containing the payload, the payload cassette comprising a bottom wall contiguous with a portion of the airframe faceted bottom surface, wherein the payload cassette pivots open over the target area, rotating the bottom wall downward to deflect an external airstream, and releases the payload into an aft calm air zone, allowing the payload to fall and arrive unharmed at the target area unaided by an aerodynamic deceleration device.

10. A method for delivering a payload by air at a target area without stopping, comprising the steps of:
   providing an aircraft adapted to fly less than 10 feet above ground level over the target area, with a delivery trajectory including a steep descent toward the target area and a steep ascent away from the target area; a payload bay constructed to contain the payload within the aircraft; and a payload release mechanism adapted to release the payload from the payload bay when the aircraft flies over the target area, allowing the payload to fall and arrive unharmed at the target area unaided by an aerodynamic deceleration device;
   flying the aircraft in the delivery trajectory over the target area;
   activating the payload release mechanism to release the payload from the payload bay and deliver the payload to the target area,
   wherein the aircraft further comprises a low aspect ratio lifting body airframe having a faceted top surface and a faceted bottom surface, and a payload cassette disposed within the payload bay and containing the payload, wherein the payload cassette further comprises a bottom wall contiguous with a portion of the airframe bottom surface; and wherein when the payload release mechanism is activated, the payload cassette pivots open, rotating the bottom wall downward to deflect an external airstream and release the payload into an aft calm air zone.

11. The method of claim 10, wherein the aircraft flies the delivery trajectory at an angle of attack at or in excess of 15 degrees.

12. The method of claim 10, wherein the aircraft flies the delivery trajectory at an angle of attack at or in excess of 30 degrees.

* * * * *